United States Patent [19]
Ikeda et al.

[11] Patent Number: 5,566,372
[45] Date of Patent: Oct. 15, 1996

[54] IMAGE FORMING APPARATUS AND METHOD HAVING GRADATION CONTROL IN A DENSE AREA IN WHICH GRADATION CHARACTERISTICS ARE NON-LINEAR

[75] Inventors: Yuichi Ikeda, Tokyo; Nobuatsu Sasanuma, Yokohama, both of Japan

[73] Assignee: Canon Kabushiki Kaisha, Tokyo, Japan

[21] Appl. No.: 410,372

[22] Filed: Mar. 24, 1995

[30] Foreign Application Priority Data

Mar. 25, 1994 [JP] Japan .................................. 6-056055

[51] Int. Cl.⁶ .................................................. G03G 15/00
[52] U.S. Cl. .................................... 355/208; 358/458
[58] Field of Search ........................... 358/521, 458–520; 355/208

[56] References Cited

U.S. PATENT DOCUMENTS

| | | | |
|---|---|---|---|
| 4,113,371 | 9/1978 | Fraser et al. | 355/246 X |
| 4,504,137 | 3/1985 | Aoki et al. | 355/324 |
| 4,888,636 | 12/1989 | Abe | 358/80 |
| 4,894,685 | 1/1990 | Shoji | 355/326 X |
| 4,914,459 | 4/1990 | Mama et al. | 346/160 |
| 4,950,905 | 8/1990 | Butler et al. | 355/246 X |
| 4,963,898 | 10/1990 | Kadowaki et al. | 346/157 |
| 4,989,985 | 2/1991 | Hubble, III et al. | 356/445 |
| 5,057,913 | 10/1991 | Nagata et al. | 358/302 |
| 5,061,949 | 10/1991 | Ogino et al. | 346/160 |
| 5,083,161 | 1/1992 | Borton et al. | 355/208 |
| 5,148,289 | 9/1992 | Nishiyama et al. | 355/246 X |
| 5,187,593 | 2/1993 | Kurita et al. | 358/434 |
| 5,189,441 | 2/1993 | Fukui et al. | 346/160 |
| 5,194,878 | 3/1993 | Murakami et al. | 346/108 |
| 5,204,538 | 4/1993 | Genovese | 356/448 X |
| 5,206,686 | 4/1993 | Fukui et al. | 355/208 |
| 5,258,783 | 11/1993 | Sasanuma et al. | 346/157 |
| 5,298,944 | 3/1994 | Sawayama et al. | 355/208 |
| 5,305,057 | 4/1994 | Hattori et al. | 355/208 X |
| 5,319,433 | 6/1994 | Fukushima et al. | 355/326 |
| 5,363,318 | 11/1994 | McCauley | 358/519 X |
| 5,406,390 | 4/1995 | Mizoguchi | 358/456 |
| 5,414,531 | 5/1995 | Amemiya et al. | 358/465 |

FOREIGN PATENT DOCUMENTS 477730  4/1992  European Pat. Off. .

OTHER PUBLICATIONS

Patent Abstracts of Japan, abstract for Kokai 1–181284 (Jul. 1989).
Patent Abstracts of Japan, abstract for Kokai 60–165667 (Aug. 1985).

Primary Examiner—Joan H. Pendegrass
Assistant Examiner—Quana Grainger
Attorney, Agent, or Firm—Fitzpatrick, Cella, Harper & Scinto

[57] ABSTRACT

An image forming apparatus performs excellent gradation control in a dense area in which gradation characteristics are non-linear. The image forming apparatus has a pattern forming unit which forms a gradation pattern on a recording member, and a read unit which reads the gradation pattern formed by the pattern forming unit. An adjusting unit adjusts image forming conditions on the basis of the gradation pattern read by the pattern read unit. In a density area in which gradation characteristics are non-linear, the number of steps of the gradation pattern is set to be larger than that in another density area.

22 Claims, 39 Drawing Sheets

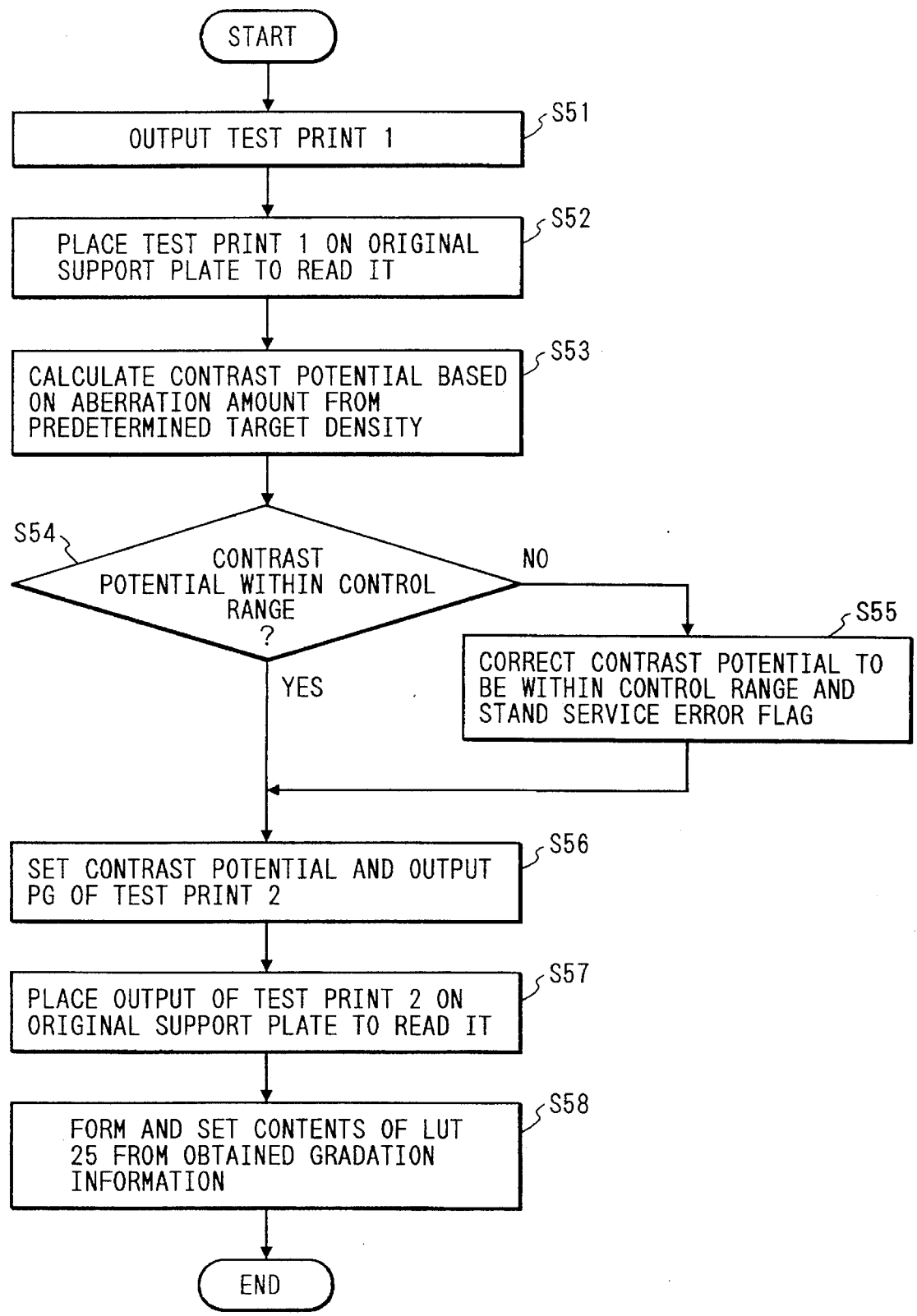

SPECTRAL CHARACTERISTIC OF YELLOW TONER

SPECTRAL CHARACTERISTIC OF MAGENTA TONER

SPECTRAL CHARACTERISTIC OF CYAN TONER

SPECTRAL CHARACTERISTIC OF BLACK TONER

RECORDING MEMBER

☐ ··· OUTPUT POINTS IN CONVENTIONAL ART
0, 10h, 20h, 30h, ··· f0h, ffh

△ ··· OUTPUT POINTS IN THE PRESENT EMBODIMENT
0, 04h, 08h, 0ch, 10h, 20h, ··· f0h, ffh

FIG. 38
(PRIOR ART)
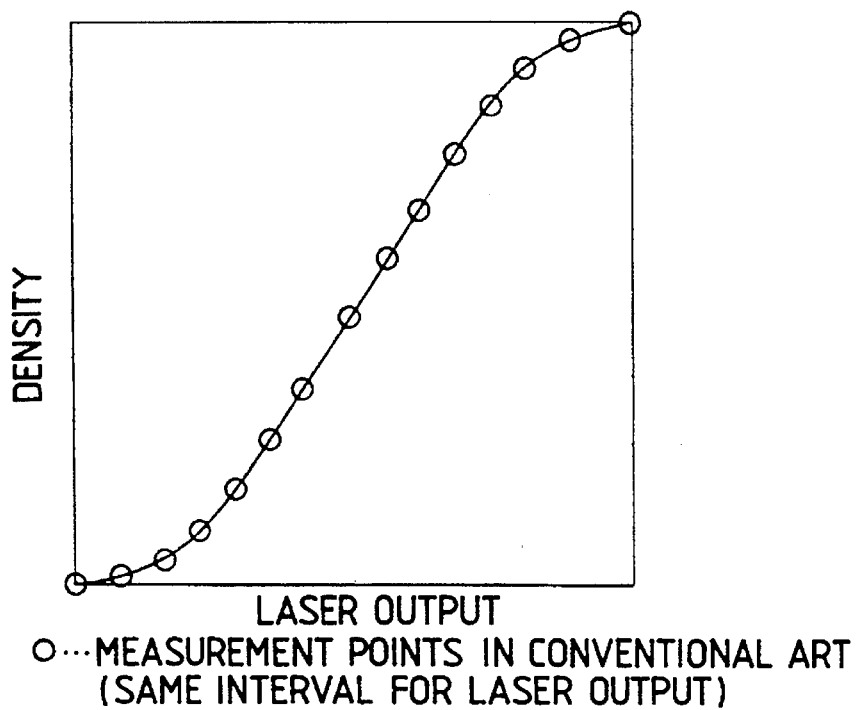
○···MEASUREMENT POINTS IN CONVENTIONAL ART
(SAME INTERVAL FOR LASER OUTPUT)
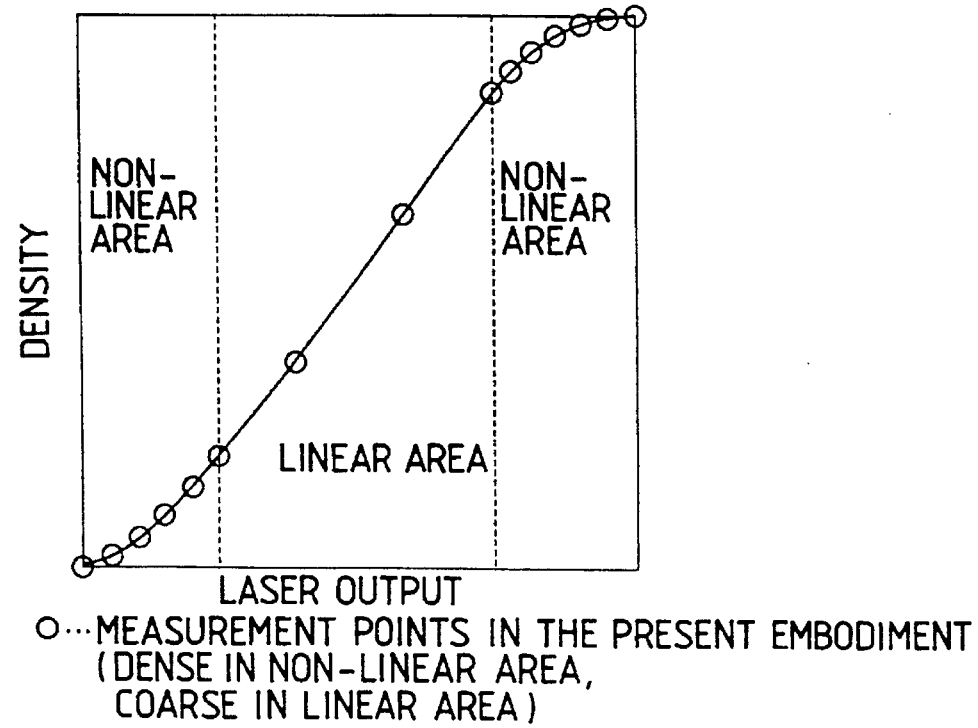
○···MEASUREMENT POINTS IN THE PRESENT EMBODIMENT
(DENSE IN NON-LINEAR AREA,
COARSE IN LINEAR AREA)

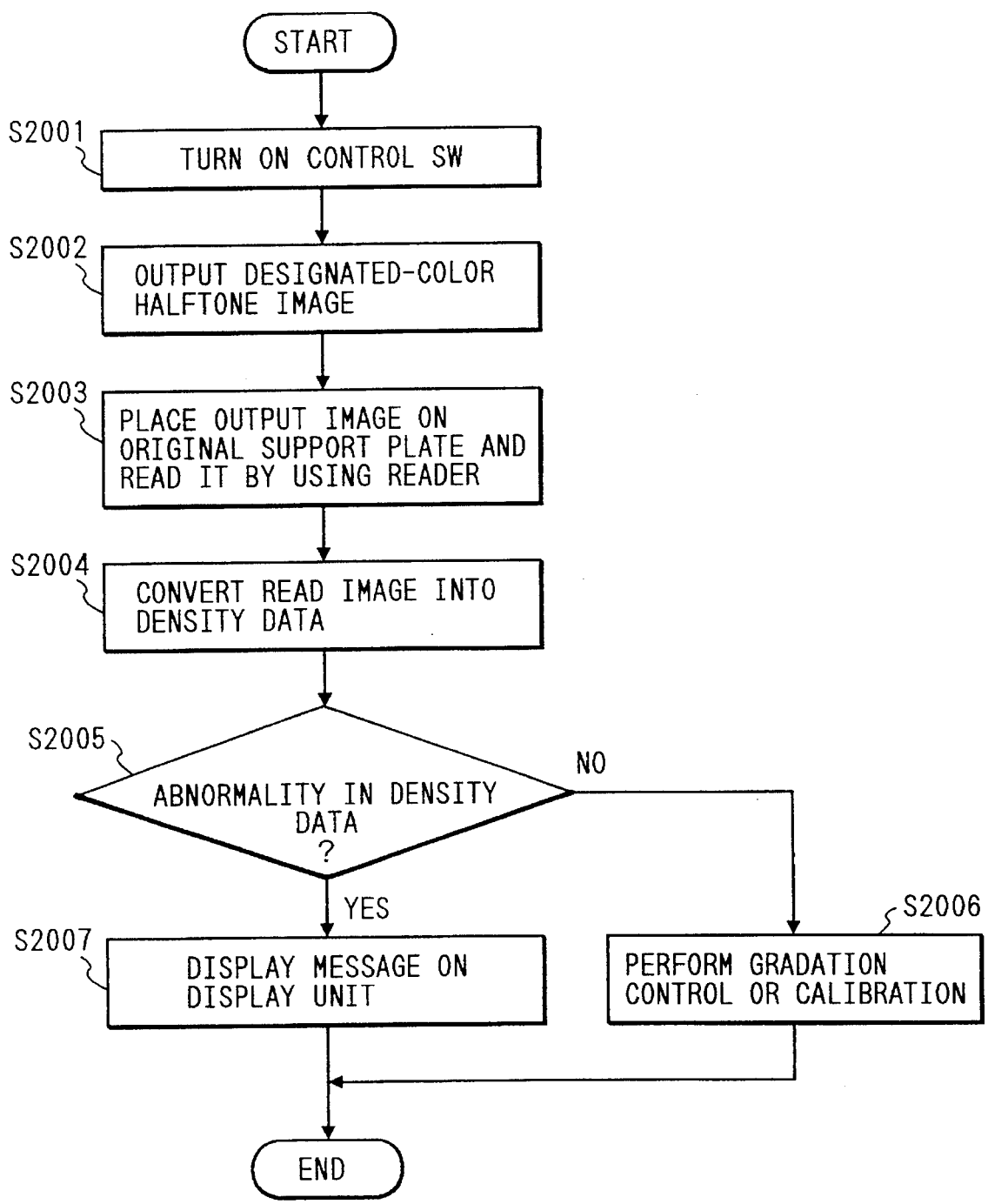

IMAGE FORMING APPARATUS AND METHOD HAVING GRADATION CONTROL IN A DENSE AREA IN WHICH GRADATION CHARACTERISTICS ARE NON-LINEAR

BACKGROUND OF THE INVENTION

1. Field of the Invention

The invention relates to image forming method and apparatus for forming an image on a recording material.

2. Related Background

Hitherto, there has been known a method whereby an image forming apparatus is activated and, after completion of a warm-up, a specific pattern is formed on an image holding member, a density of the pattern on the image holding member is read and is fed back to produce image forming conditions such as a gamma correction or calibration and the like, thereby improving stability and image quality.

Further, in the case where image forming characteristics are changed due to an environmental fluctuation or the like, the specific pattern is again formed on the image holding member in accordance with an environmental fluctuation amount, a density of the pattern on the image holding member is read and is fed back to produce the image forming conditions such as gamma correction or calibration and the like, thereby stabilizing image quality.

In the above conventional method, however, in the case where the image forming apparatus is used for a long time, there occurs a case where the read density of the pattern on the image holding member doesn't coincide with a density of the image which was actually printed out.

For example, since a cleaning blade for cleaning a transfer residual toner has come into contact with the image holding member and the image holding member is rubbed for a long time, the surface of the image holding member becomes rough and the relation between a deposition amount of the toner and a reflected light amount changes from an initial state.

There is, consequently, a drawback such that when the image forming apparatus which was used for a long time is fed back to produce the image forming conditions by using the density data converted by an initial density conversion parameter, the optimum image cannot be obtained.

On the other hand, in the above conventional method, since no consideration is made relative to a deterioration of the maximum image density of the image forming apparatus, in the case where the maximum image density output is decreased due to an influence by a durability fluctuation or the like, there is a drawback such that even if a gamma characteristic is corrected, a gradation of the image deteriorates in a region of a high image density.

In the above conventional method, since a gradation characteristic of the image forming apparatus is not linear (particularly, a highlight), when data between density data is interpolated by an approximate expression, the resultant density differs from the actual density. There is, consequently, a drawback such that when the density is fed back to produce the image forming conditions by using the gradation data, the optimum image is not obtained.

Further, according to the above conventional method, when a uniform density is output to the whole surface of the recording member in the image forming apparatus, in the case where a jump of a density appears due to a charging variation caused by dirt of a charging device, the density changes in dependence on the location even in case of the same density output. There is a drawback such that in the above state, if the density is fed back to produce the image forming conditions by using the gradation data, the optimum image is not obtained.

SUMMARY OF THE INVENTION

It is, therefore, an object of the invention to stabilize a picture quality by a plurality of kinds of calibrations.

Another object of the invention is to improve an operability during calibration.

Still another object of the invention is to effectively use the maximum density which can be expressed by an image forming means.

Further another object of the invention is to perform a good gradation control in a density region in which a gradation characteristic is not linear.

Further another object of the invention is to stably adjust image forming conditions by judging the uniformity of a reference pattern.

According to the present invention, the above objects are accomplished by an image forming apparatus comprising: input means for inputting image data; generating means for generating gradation pattern data; forming means for forming an image on a medium in accordance with the image data or the gradation pattern data; detecting means for detecting a gradation pattern on the medium formed by the forming means in accordance with the gradation pattern data; and control means for controlling a condition of the image forming apparatus based on the detection result of the detecting means, wherein the gradation pattern comprises a plurality of areas of which density levels are different from each other and a number of density levels are smaller in a density range in which a gradation characteristic is substantially more linear than in another density range.

According to the invention, the above objects are also accomplished by an image forming method comprising: an input step of inputting image data; a generating step of generating gradation pattern data; a forming step of forming an image or a medium in accordance with the image data or the gradation pattern data; a detecting step of detecting a gradation pattern on the medium formed in the forming step in accordance with the gradation pattern data; and a control step of controlling a condition of an image forming apparatus based on the detection result of the detecting step, wherein the gradation pattern comprises a plurality of areas of which density levels are different from each other and a number of density levels are smaller in a density range in which a gradation characteristic is substantially more linear than in another density range.

The above and other objects and features of the present invention will become apparent from the following detailed description and the appended claims with reference to the accompanying drawings.

BRIEF DESCRIPTION OF THE DRAWINGS

FIG. 7 is a flowchart for a first control system;

FIG. 38 is an explanatory diagram of measurement points;

FIG. 42 is a flowchart for an embodiment 3;

DETAILED DESCRIPTION OF THE PREFERRED EMBODIMENTS

First embodiment

An embodiment of the invention will now be described in detail hereinbelow with reference to the drawings.

Figure 1:
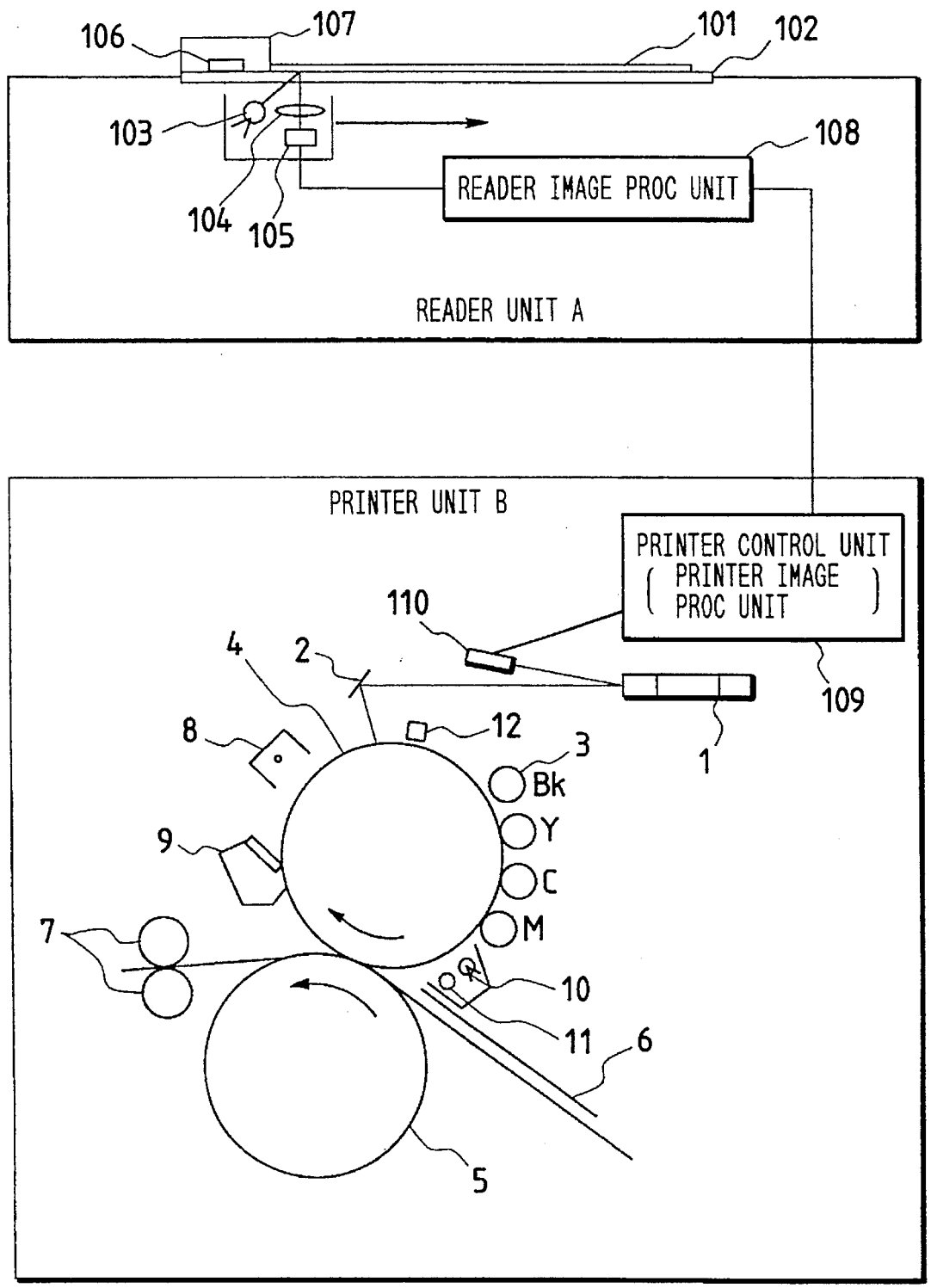
FIG. 1 is a constructional cross sectional view of an embodiment 1.

FIG. 1 shows a constructional diagram of the embodiment.

A full-color image forming method will be first explained.

An original 101 put on an original support plate glass 102 is irradiated by a light source 103 and an image of the original is formed on a CCD sensor 105 through an optical system 104. The CCD sensor 105 produces color component signals of red, green, and blue, and every line sensor by a group of CCD line sensors of red, green, and blue are arranged in three lines.

Those read optical system units scan in the direction of the arrow, thereby converting the original to an electric signal data train for every line.

A collision member 107 for colliding the position of the original and thereby preventing the original from being obliquely placed is arranged on the original support plate glass 102. A reference white plate 106 for deciding a white level of the CCD sensor 105 and for performing a shading in the thrust direction of the CCD sensor 105 is arranged on the original support plate glass.

The image signal obtained by the CCD sensor 105 is processed by a reader image processing unit 108. After that, it is sent to a printer unit B and is processed by a printer control unit or a printer image processing unit 109.

The image processing unit 108 will now be described.

Figures 2, 2A:
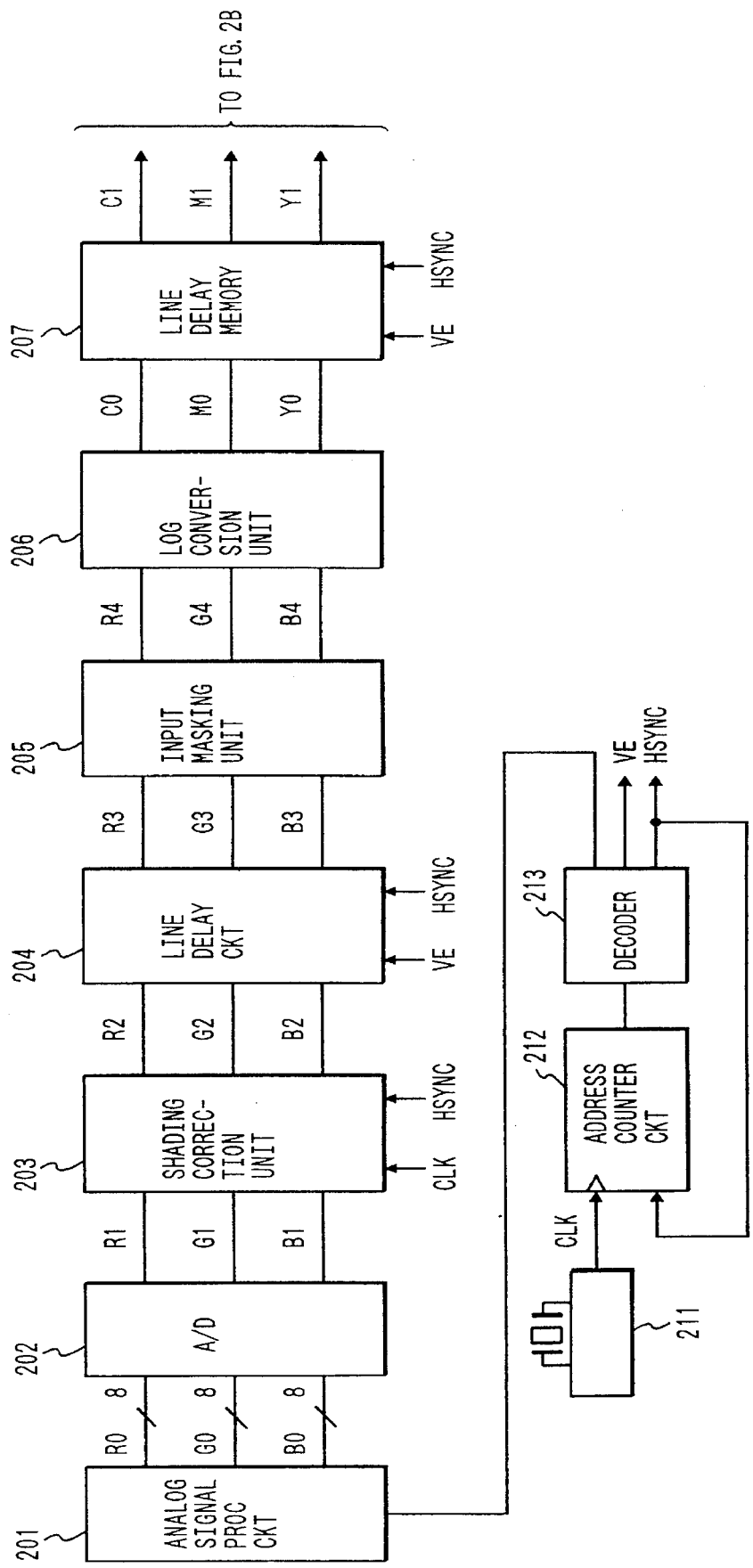
FIG. 2 which is comprised of FIGS. 2A and 2B is a constructional block diagram of a reader image processing unit 108 in the embodiment 1.
Figure 2B:
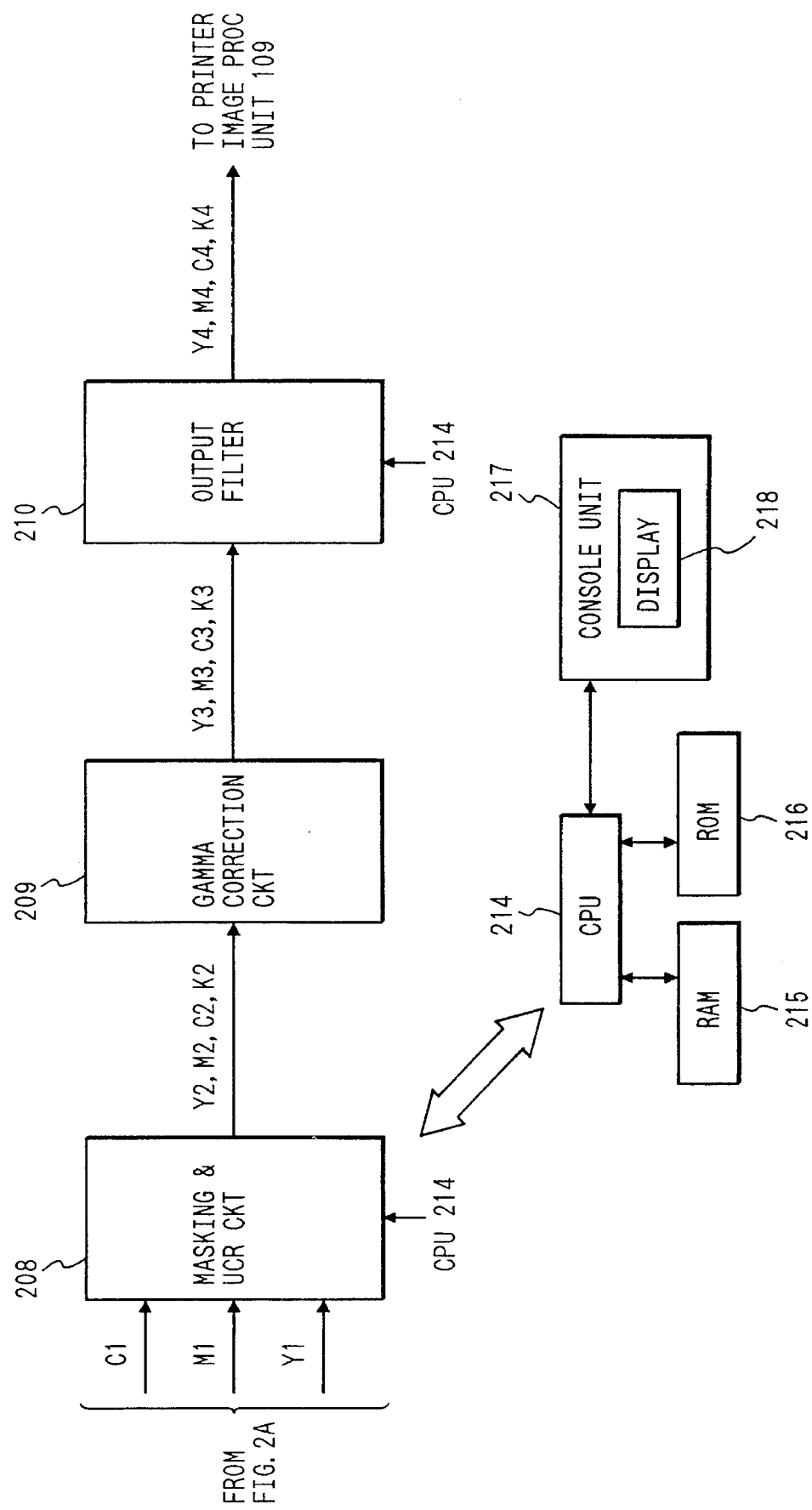

FIGS. 2A and 2B are block diagrams showing a flow of the image signal in the image processing unit 108 of a reader unit A according to the embodiment. As shown in the diagram, the image signals which are output from the CCD sensor 105 are input to an analog signal processing circuit 201, by which they are subjected to a gain adjustment and an offset adjustment. After that, the processed signals are converted to 8-bit digital image signals R1, G1, and B1, and each color signal is converted by an A/D converter 202, respectively. Subsequently, those digital image signals are input to a shading correction unit 203 and are subjected to a well-known shading correction using a read signal of the reference white plate 106 for every color.

A clock generating unit 211 generates a clock of a one-pixel unit. A main scan address counter 212 counts the number of clocks from the clock generating unit 211 and produces a pixel address output of one line. A decoder 213 decodes a main scan address from the main scan address counter 212 and produces a CCD drive signal of a line unit such as a shift pulse, a reset pulse, or the like, a VE signal indicative of an effective area in the read signal of one line from the CCD, and a line sync signal HSYNC. The main scan address counter 212 is cleared by the HSYNC signal and starts to count the main scan address of the next line.

Since the line sensors of the CCD sensor 105 are arranged so as to be spaced from each other by a predetermined distance, a spatial aberration in the sub scan direction is corrected. Specifically, the signals of R and G are line-dclayed in the sub scan direction, thereby matching with the B signal in the sub scan direction for the B signal.

An input masking unit 205 is used to convert a read color space that is determined by spectral characteristics of filters of R, G, and B of the CCD sensor, to a standard color space of NTSC and executes a matrix arithmetic operation as shown by the following equation.

$$\begin{bmatrix} R4 \\ G4 \\ B4 \end{bmatrix} = \begin{bmatrix} a11 & a12 & a13 \\ a21 & a22 & a23 \\ a31 & a32 & a33 \end{bmatrix} \begin{bmatrix} R3 \\ G3 \\ B3 \end{bmatrix} \quad (1)$$

A light amount/density converting unit (LOG converting unit) 206 is constructed by a lookup table ROM. Luminance signals of R4, G4, and B4 are converted to density signals of CO, MO, and YO. A line delay memory 207 delays image signals of CO, MO, and YO by only line delay amounts until judgment signals of UCR, FILTER, SEN, and the like which are formed from the R4, G4, and B4 signals by a black character judging section (not shown).

A masking & UCR circuit 208 extracts a black signal (Bk) by three input primary color signals of Y1, M1, and C1 and further executes arithmetic operations for correcting a color turbidity of a recording color member in the printer unit B and sequentially outputs signals of Y2, M2, C2, and Bk2 by a predetermined bit width (8 bits) each time a reading operation is executed. That is, the masking & UCR circuit 208 outputs frame-sequential data of Y, M, C, and Bk.

A gamma correction circuit 209 executes a density correction in the reader unit A so as to match with ideal gradation characteristics of the printer unit B. A space filter processing unit (output filter) 210 executes an edge emphasis and a smoothing process.

Area-sequential image signals of M4, C4, Y4, and Bk4 processed as mentioned above are sent to the printer control unit 109 and a density recording by a PWM (pulse width modulation) is executed in the printer unit B.

Reference numeral 214 denotes a CPU to perform a control in the reader unit; 215 a RAM; 216 a ROM; and 217 a console unit having a display 218.

Figure 3:
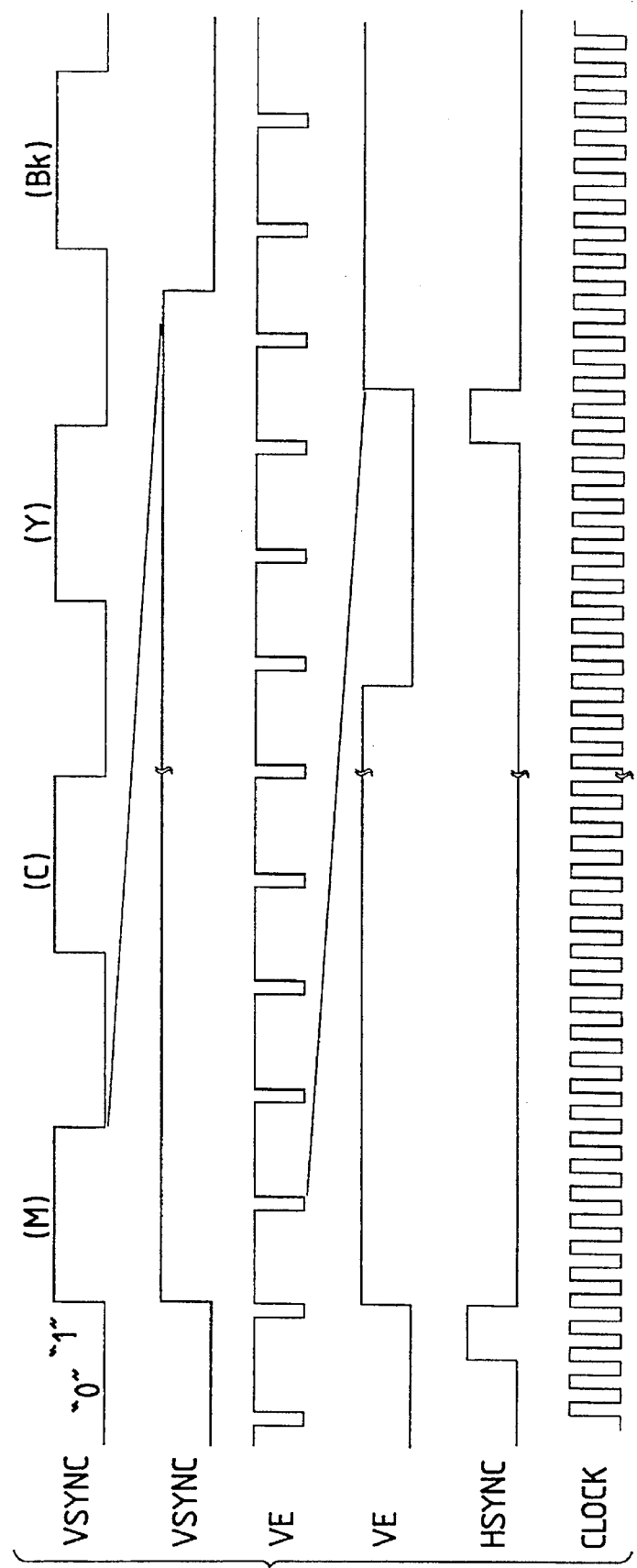
FIG. 3 is a diagram showing a timing of the reader image processing unit 108 in the embodiment 1.

FIG. 3 is a diagram showing a timing for each control signal in the image processing unit 108 shown in FIGS. 2A and 2B. In the diagram, a VSYNC signal is an image effective interval signal in the sub scan direction. In an interval of a logic "1", an image reading (scan) is executed and output signals of (C), (M), (Y), and (Bk) are sequentially formed. The VE signal is an image effective interval signal in the main scan direction and has a timing of the main scan start position in the interval of logic "1" and is mainly used for a line count control of a line delay. A CLOCK signal is a pixel sync signal and is used to transfer image data at a leading timing of "0"→"1".

The printer unit B will now be described.

In FIG. 1, a photosensitive drum 4 is uniformly charged by a primary charging device 8.

Image data is converted to a laser beam through a laser driver and a laser light source 110 included in the printer image processing unit 109. The laser beam is reflected by a polygon mirror 1 and a mirror 2 and is irradiated onto the photosensitive drum 4 which was charged uniformly.

The photosensitive drum 4 on which a latent image was formed by a scan of the laser beam is rotated in the direction of the arrow shown in the diagram.

A developing device 3 sequentially executes a development every color.

In the embodiment, a 2-component system is used as a developing system and the developing devices 3 of colors are arranged from an upstream position around the photosensitive drum 4 in accordance with the order of black (Bk), yellow (Y), cyan (C), and magenta (M). The developing device according to the image signal executes a developing operation at a timing to develop a latent image area formed on the photosensitive drum.

On the other hand, a transfer paper 6 is wrapped around a transfer drum 5 and the drum is rotated one by one in accordance with the order of M, C, Y, and Bk, so that the transfer drum 5 is rotated a total four times and the toner image of each color is transferred onto the transfer paper 6 in a multiplexing manner.

After completion of the transfer of the toner images, the transfer paper 6 is separated from the transfer drum 5 and is fixed by a fixing roller pair 7, so that a full-color image print is completed.

A surface potential sensor 12 is arranged on an upstream side of the developing devices 3 of the photosensitive drum 4.

A cleaner 9 is provided to clean the transfer residual toner on the photosensitive drum 4. An LED light source 10 (having a main wavelength of about 960 nm) and a photodiode 11 for detecting a reflection light amount of a toner patch pattern formed on the photosensitive drum 4, which will be explained hereinlater, are also provided.

Figure 4:
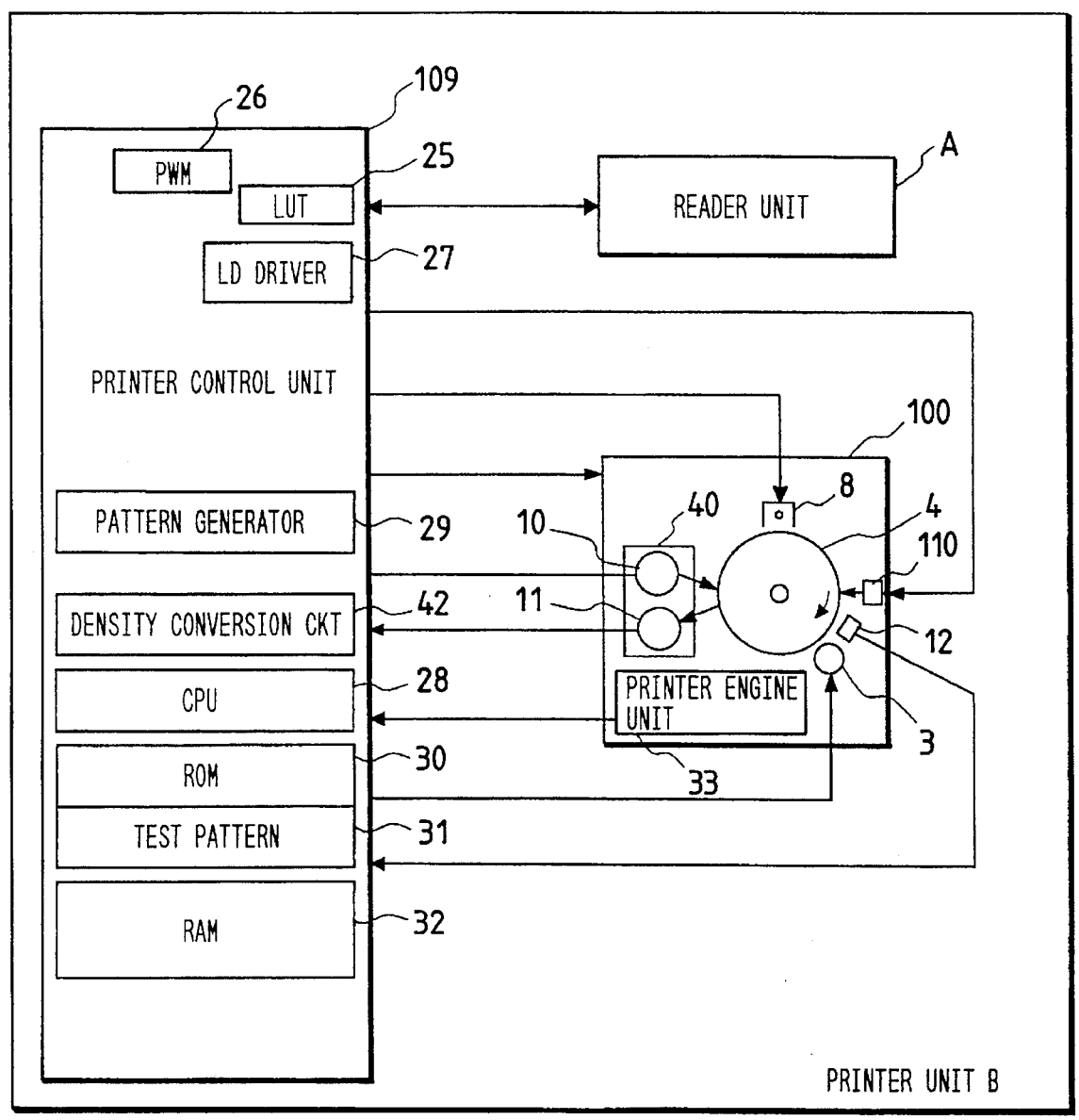
FIG. 4 is a control block diagram of the embodiment 1.

FIG. 4 is a constructional block diagram of the image forming apparatus according to the embodiment.

The printer image processing unit 109 is constructed by a CPU 28, a ROM 30, a RAM 32, a test pattern memory unit 31, a density conversion circuit 42, and an LUT 25 and can communicate with the reader unit A and a printer engine unit 100.

In the printer engine unit 100, an optical reading apparatus 40 comprising the LED 10 for irradiating near-infrared light and the photodiode 11, the primary charging device 8, a laser 101, the surface potential sensor 12, and the developing device 3 which are arranged around the photosensitive drum 4 are controlled by a printer control unit 109.

An environmental sensor 33 is provided to measure a moisture amount in the air in the apparatus.

The surface potential sensor 12 is provided on the upstream side than the developing devices 3. A grid potential of the primary charging device 8 and development biases of the developing devices 3 are controlled by the CPU 28 as will be explained hereinlater.

Figure 5:
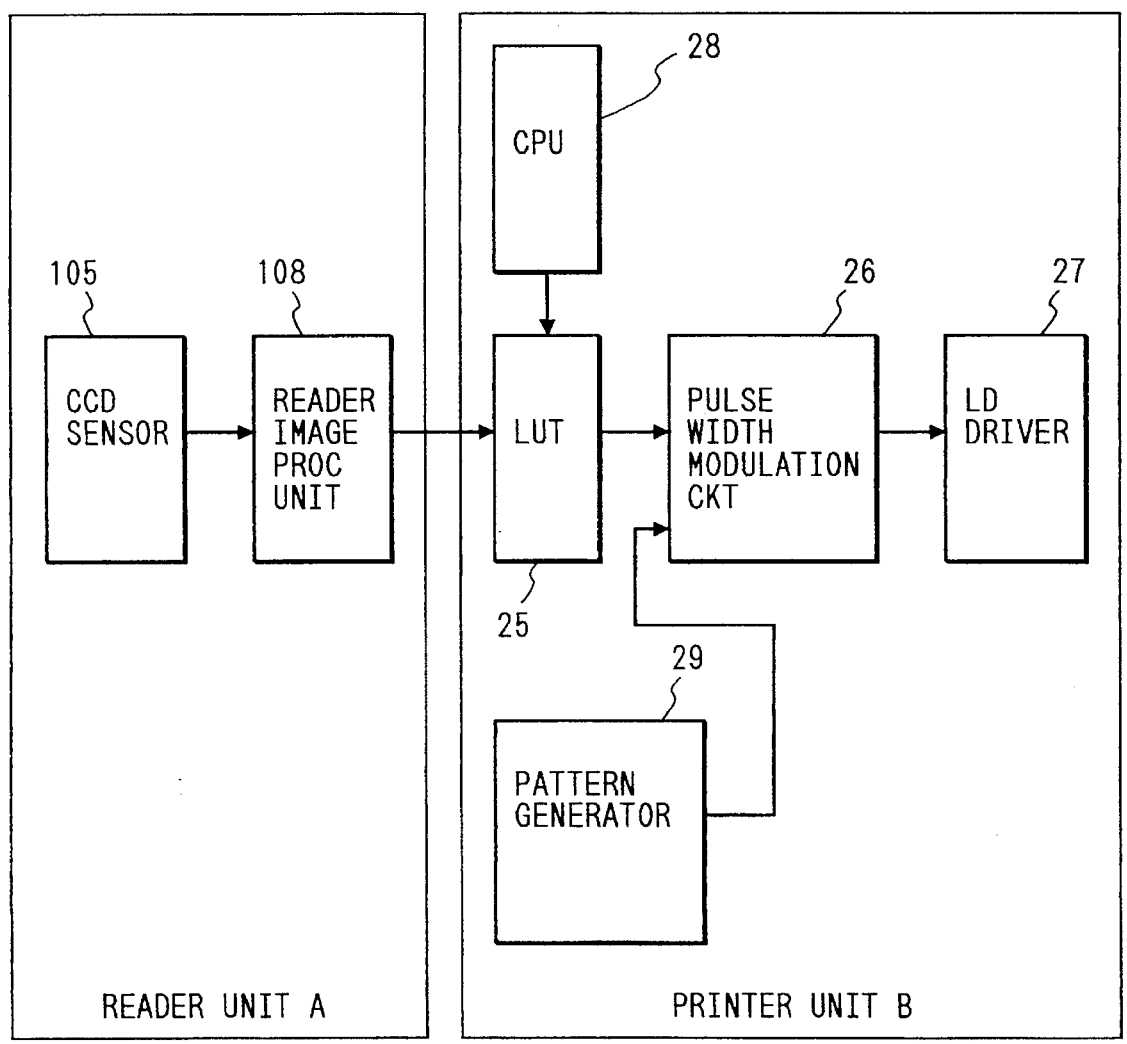
FIG. 5 is a block diagram showing the embodiment 1.

FIG. 5 shows an image signal processing circuit to obtain a gradation image according to the embodiment.

A luminance signal of the image is obtained by the CCD sensor 105 and is converted to area-sequential image signal by the reader image processing unit 108. Density characteristics of the image signal are converted by the LUT 25 so that a density of an original image that is expressed by the image signal to which gamma characteristics of the printer at the time of initial setting were input coincides with a density of an output image.

Figure 6:
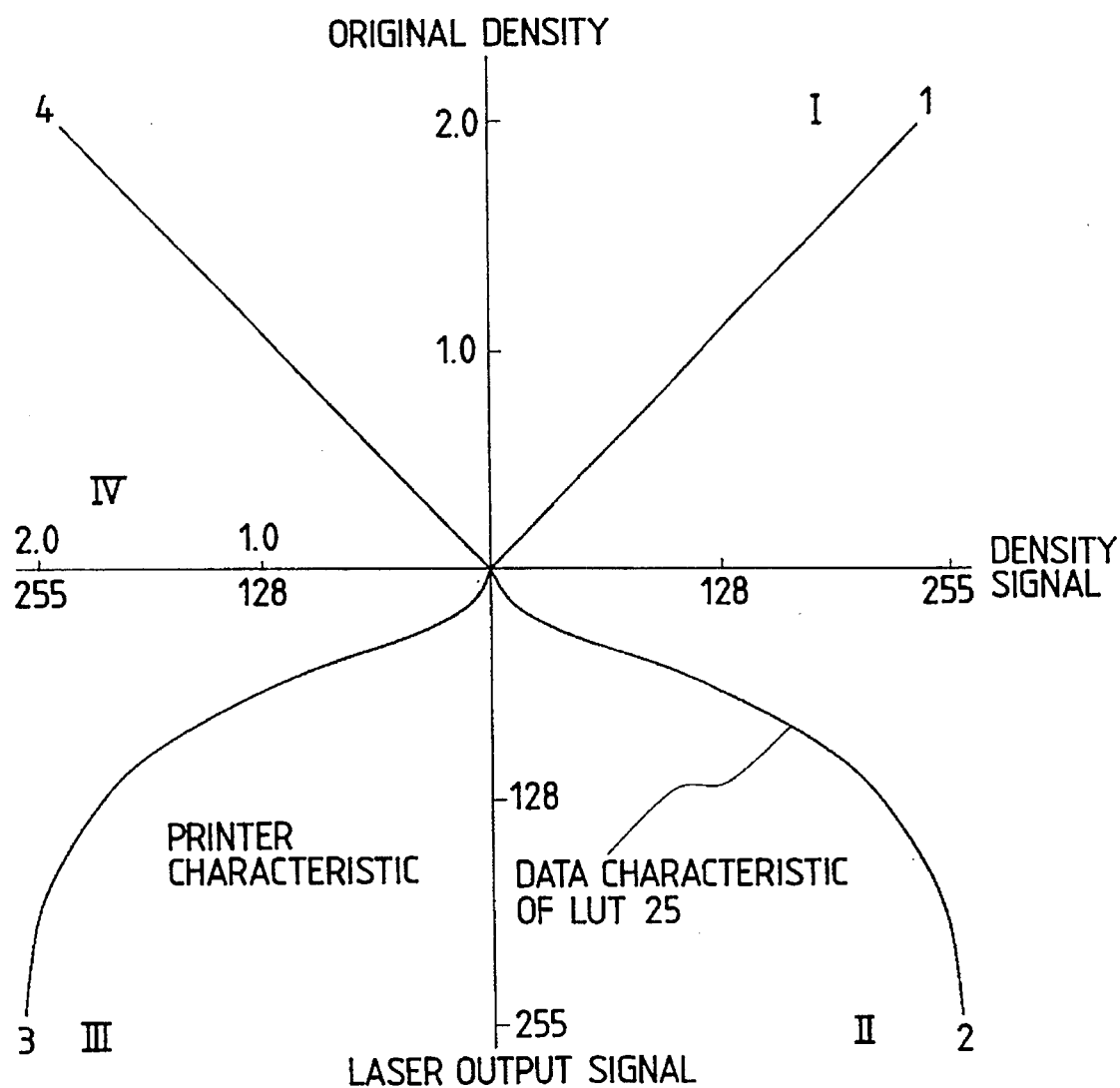
FIG. 6 is a 4-quadrant chart showing gradation reproducing characteristics.

A state in which a gradation is reconstructed is shown by a 4-quadrant chart in FIG. 6.

The I quadrant shows reading characteristics of the reader unit A for converting the original density to the density signal. The II quadrant shows converting characteristics of the LUT 25 to convert the density signal to the laser output signal. The III quadrant shows recording characteristics of the printer unit B for converting the laser output signal to the output density. The IV quadrant shows total gradation reconstructing characteristics of the image forming apparatus showing the relation from the original density to the output density.

Since the gradation is processed by the 8-bit digital signal, the number of gradations is set to 256.

In the image forming apparatus, in order to make the gradation characteristics of the IV quadrant linear, a non-linear portion of the printer characteristics of the III quadrant is corrected by the LUT 25 of the IV quadrant.

The LUT 25 is formed by an arithmetic operation result, which will be explained hereinlater.

After completion of the density conversion by the LUT 25, the signal is converted to the signal corresponding to a dot width by a pulse width modulation (PWM) circuit 26 and is sent to a laser driver 27 to on/off control the laser.

In the embodiment, a gradation expressing method by a pulse width modulating process is used for all of the colors of Y, M, C, and Bk.

By the scan of the laser light source 110, a latent image having a predetermined gradation characteristic is formed on the photosensitive drum 4 due to a change in dot area and is subjected to processes such as development, transfer, and fixing, so that a gradation image is reproduced.

When a test pattern is formed, a pattern generator 29 generates a pattern on the basis of data stored in the test pattern memory unit 31.

(Gradation control [calibration] of a system including both of the reader/printer)

A first control system regarding a stabilization of image reconstructing characteristics of a system including both of the reader unit A and the printer unit B will now be described.

First, a calibration of the printer unit B by using the reader unit A will be described with reference to a flowchart of FIG. 7. The flow is realized by the CPU 214 to control the reader unit A and the CPU 28 to control the printer unit B.

When the operator depresses a mode setting button for an automatic gradation correction or calibration provided on the console unit 217, a present control is started. In the embodiment, the display 218 is constructed by a liquid crystal operation panel (touch panel display) with push sensors as shown in FIGS. 8A to 10E. A display to the display 218 is controlled by the CPU 214.

Figure 8A:
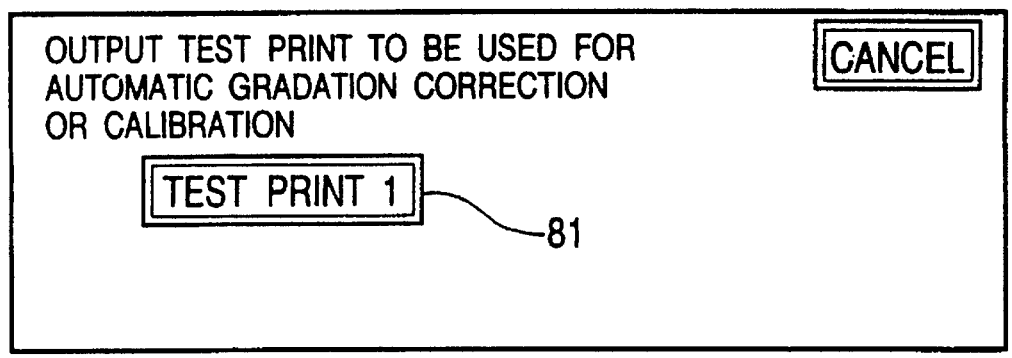
FIGS. 8A to 8C are diagrams showing display contents of a display 218.
Figure 11:
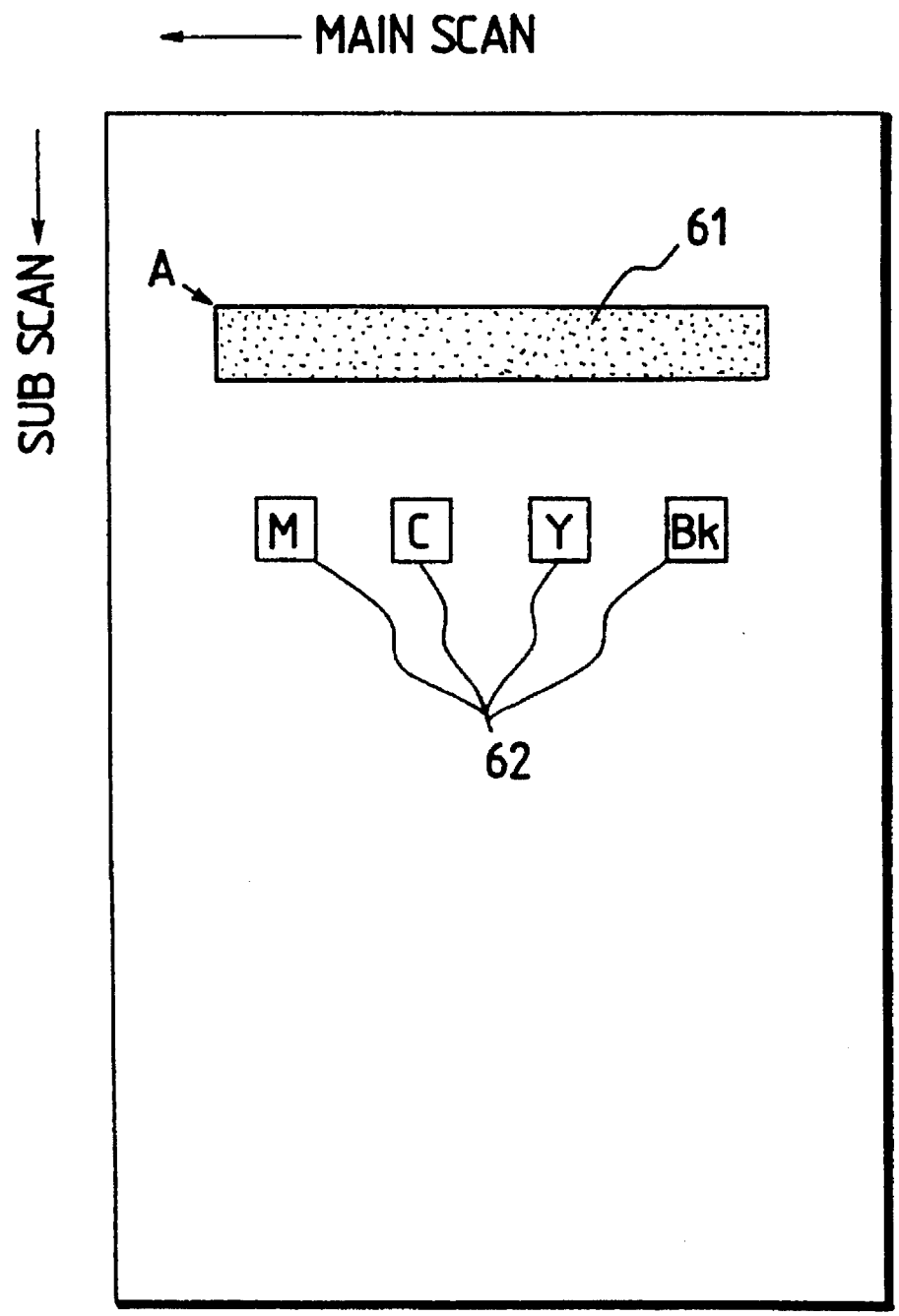
FIG. 11 is a diagram showing an example of a test print 1.

In step S51, a print start button 81 of a test print 1 appears on the display 218 (refer to FIG. 8A). By depressing the button 81, an image of the test print 1 shown in FIG. 11 is printed out by the printer unit B.

Figure 8B:
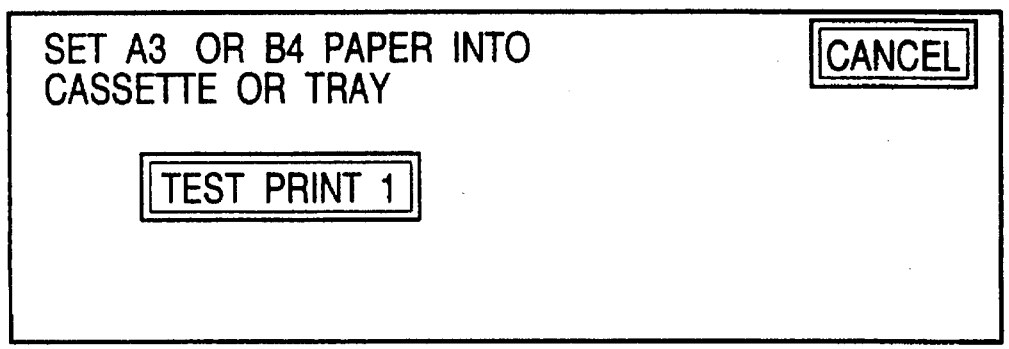
Figure 8C:
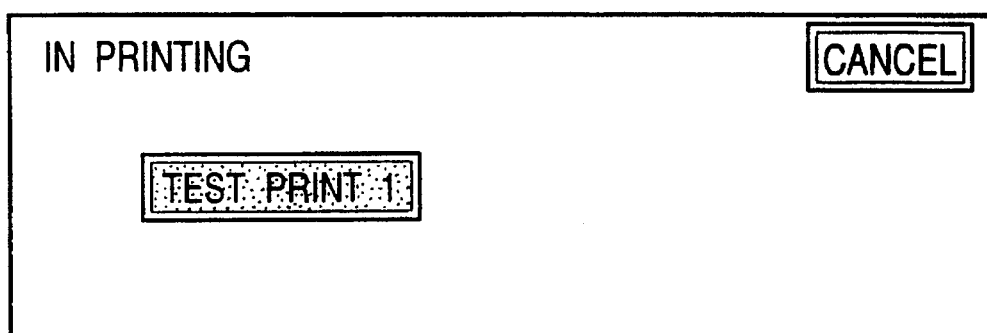

In this instance, the presence or absence of the paper to form the test print 1 is judged by the CPU 214. When such a paper doesn't exist, an alarm display as shown in FIG. 8B is performed.

When the test print 1 is formed, a contrast potential (which will be explained hereinlater) in a standard state according to an environment is registered as an initial value and is used.

The image forming apparatus used in the embodiment has a plurality of paper cassettes and a plurality of kinds of paper sizes such as B4, A3, A4, B5, and the like which can be selected.

However, as a print paper which is used in this control, in order to avoid an error due to a mistake about the vertical placement or lateral placement in a subsequent reading operation, what is called a large-size paper is used. Namely, it is set so as to use papers of the sizes of B4, A3, 11×17, and LGR.

A belt-like pattern 61 due to a half-tone density of four colors of Y, M, C, and Bk is formed in the test pattern 1 in FIG. 11. The test pattern 1 is formed on the basis of the data from the pattern generator 29.

To visually inspect the pattern 61, it is confirmed that a stripe-shaped abnormal image, a density variation, and a color variation don't exist. As for the pattern 61, a size in the main scan direction of the CCD sensor 105 is set so as to cover a patch pattern 62 and gradation patterns 71 and 72 (FIG. 12) in the thrust direction.

In the case where an abnormality is recognized, the test print 1 is again printed. When an abnormality is again recognized, a service man is called.

It is also possible to read the belt pattern 61 by the reader unit A and to automatically judge whether the subsequent control should be executed or not by density information in the thrust direction.

On the other hand, the pattern 62 indicates the maximum density patch of each color of Y, M, C, and Bk and uses 255 levels as a density signal value.

Figure 9A:
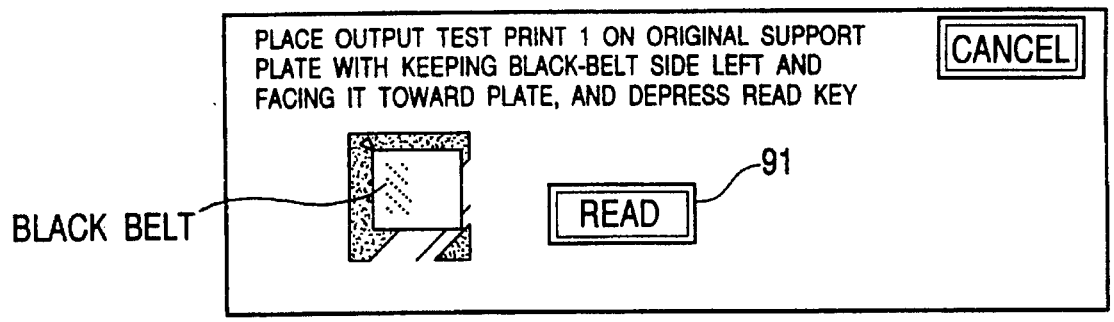
FIGS. 9A to 9C are diagrams showing display contents of the display 218.
Figure 13:
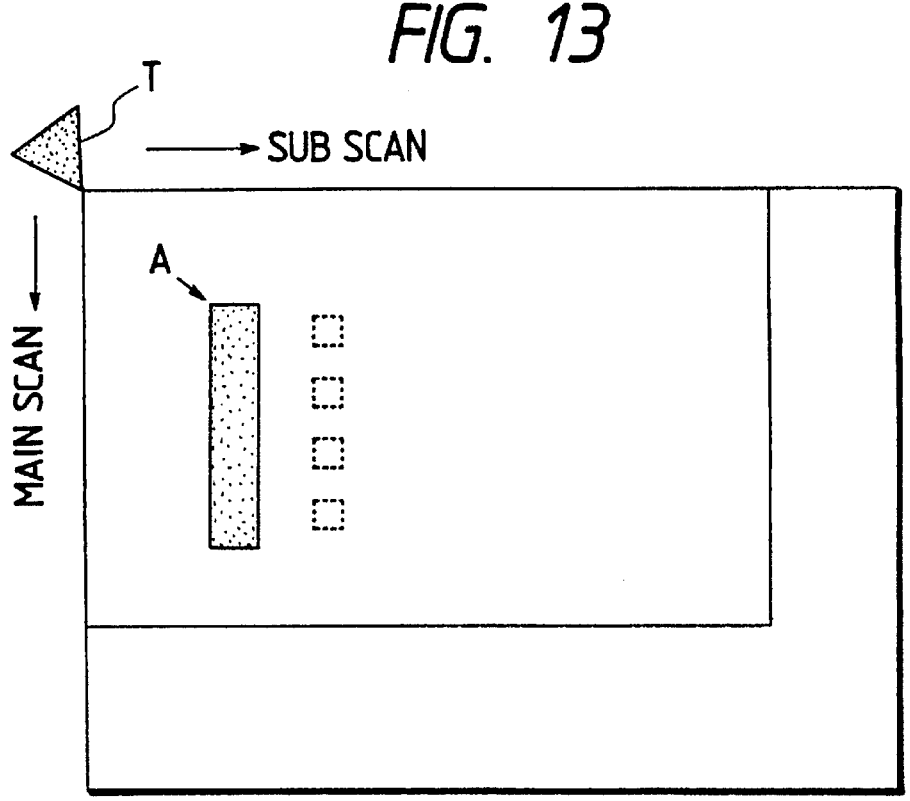
FIG. 13 is a diagram showing a placing method of the test print 1 on an original support plate.

In step S52, the image of the test print 1 is placed onto the original support plate glass 102 as shown in FIG. 13 and a read start button 91 shown in FIG. 9A is depressed.

In this instance, a guidance display for the operator shown in FIG. 9A appears.

FIG. 13 is a diagram when the original support plate is seen from the upper portion. A left upper wedge-shaped mark T is a mark for original collision of the original support plate. The message as mentioned above is displayed on the operation panel in a manner such that the belt pattern 61 comes on the collision mark T side and the front and back surfaces are not erroneously set. By performing such operations, a control error due to an erroneous placement is prevented.

When the pattern 62 is read by the reader unit A, a display screen is gradually scanned from the collision mark T. Since the first density gap point A is obtained at the corner of the pattern 61, a position of each patch of the pattern 62 is determined as relative coordinates from the coordinates point and the density value of the pattern 62 is read.

Figure 9B:
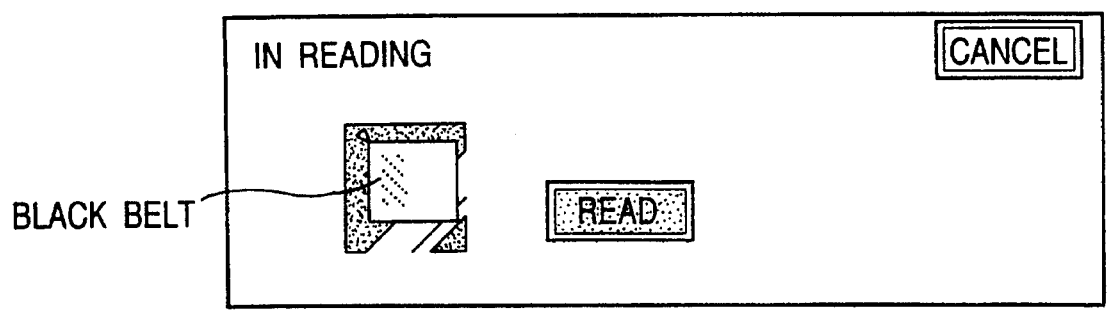
Figure 9C:
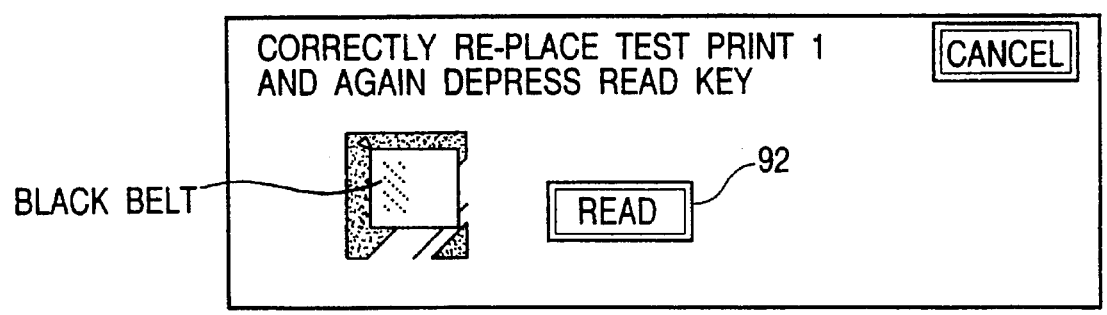

The display as shown in FIG. 9B is performed during the reading operation. When the reading operation cannot be performed because the direction or position of the test print 1 is incorrect, a message as shown in FIG. 9C is displayed. The operator again places the test print and depresses a read key 92, thereby again reading the test print 1.

To convert from the RGB values obtained to the optical densities, the following equations (2) are used. To match with the same values as those of a commercially available densitometer, they are adjusted by a correction coefficient (k).

It is also possible to convert from luminance information of RGB to density information of MCYBk by using a LUT.

$$M = -km \times \log 10(G/255)$$

$$C = -kc \times \log 10(R/255)$$

$$Y = -ky \times \log 10(B/255)$$

$$Bk = -kbk \times \log 10(G/255) \quad (2)$$

A method of correcting the maximum density from the density information obtained will now be described.

Figure 15:
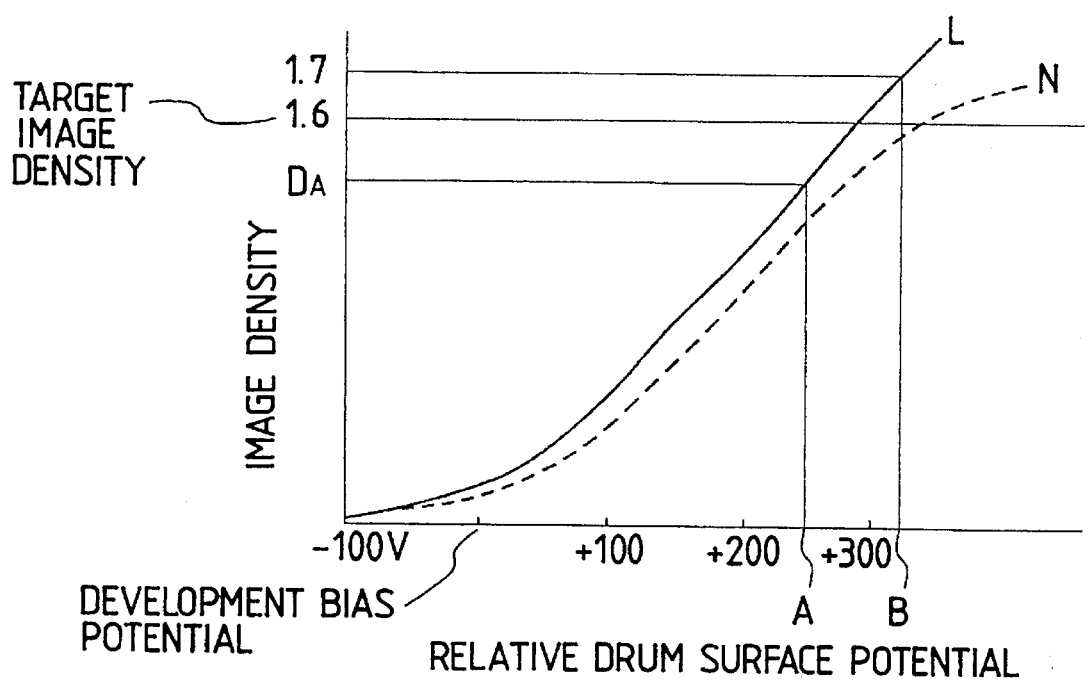
FIG. 15 is a diagram showing the relation between a relative drum surface potential and an image density.

FIG. 15 shows the relation between the relative drum surface potential and the image density obtained by the above arithmetic operations.

In the case where a difference between a contrast potential used at that time point, namely, a development bias potential and the surface potential of the photosensitive drum when a dot of the maximum level is printed by using the laser beam after the photosensitive drum was primary-charged is equal to a maximum density $D_A$ derived by the setting of A, in a density area of the maximum density, in most of the cases, the image density linearly corresponds to the relative drum surface potential as shown by a solid line L.

In the 2-component development system, in the case where the toner density in the developing device fluctuates and decreases, there is also a case where non-linear characteristics are obtained in the density area of the maximum density as shown by a broken line N.

Therefore, although the final target value of the maximum density is set to 1.6, "1.7" is set to a target value of a control to match the maximum density and a control amount is determined in consideration of a margin of 0.1.

A contrast potential B in this instance is obtained by using the following equation (3).

$$B=(A+Ka)\times 1.7/D_A \qquad (3)$$

where, Ka denotes a correction coefficient and it is desirable to optimize the value in accordance with a kind of developing system.

Figure 16:
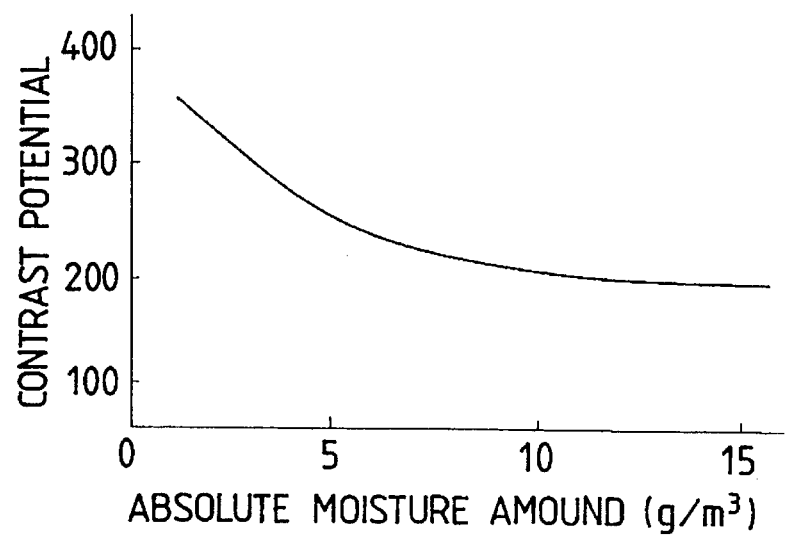
FIG. 16 is a diagram showing the relation between an absolute moisture amount and a contrast potential.

Actually, in the electrophotographic system, if the contrast potential A is not set in accordance with the environment, the image density doesn't match. Therefore, the set value of the contrast potential A is changed as shown in FIG. 16 in accordance with an output of the environmental sensor 33 to monitor a moisture amount in the apparatus as described above.

Therefore, as a method of correcting the contrast potential, a correction coefficient Vcont.rate1 according to the following equation is preserved into a backup RAM as a method of correcting the contrast potential.

$$Vcont.rate1= B/A$$

The image forming apparatus monitors a change in environment (moisture amount) every 30 minutes. Each time the value of A is decided on the basis of the detection result, A×Vcont.rate1 is calculated, thereby obtaining the contrast potential.

A method of obtaining a grid potential and a development bias potential from the contrast potential will now be simply explained.

Figure 17:
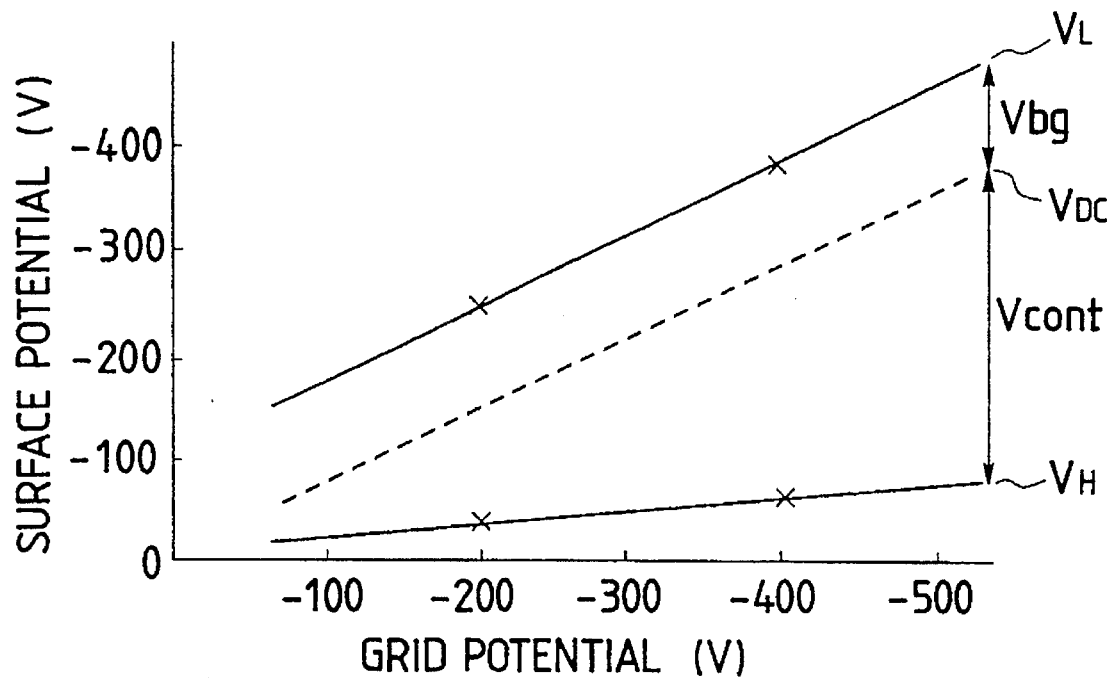
FIG. 17 is a diagram showing the relation between a grid potential and a surface potential.

FIG. 17 shows the relation between the grid potential and the photosensitive drum.

The grid potential is set to −200 V. A surface potential $V_L$ when the level of the laser beam is set to the lowest level and the scan is performed and a surface potential $V_H$ when the level of the laser beam is set to the highest level are measured by the surface potential sensor 12.

Similarly, $V_L$ and $V_H$ when the grid potential is set to −400 V are measured.

By interpolating and extrapolating the data of −200 V and the data of −400 V, the relation between the grid potential and the surface potential can be obtained.

Such a control to obtain the potential data is called a potential measurement control.

A difference between $V_L$ and Vbg (set to 100 V here) set so as not to deposit an overlap toner onto the image is provided and a development bias $V_{DC}$ is set.

A contrast potential Vcont is a differential voltage between the development bias $V_{DC}$ and $V_H$. As mentioned above, as Vcont is large, the maximum density can be set to a large value.

To set to the contrast potential B obtained by the calculation, whether a grid potential of which volts and a development bias potential of which volts are necessary can be judged by calculations from the relation of FIG. 17.

In step S53 in FIG. 7, a contrast potential is obtained so that the maximum density is higher than the final target value by 0.1. The CPU 28 sets the grid potential and development bias potential so as to obtain such a contrast potential.

In step S54, a check is made to see if the obtained contrast potential lies within a control range or not. When it is out of the control range, it is judged that there is an abnormality in the developing device or the like. An error flag is set so that a service man can easily find such an abnormality and he checks the developing device of the color corresponding to the abnormality, thereby allowing the error flag to be seen by the service man in a predetermined service mode.

In this instance, in case of such an abnormality, the contrast potential is limited to a limit value in the control range and a correction or calibration control is executed (S55), and the control is continued.

As mentioned above, the CPU 28 sets the grid potential and development bias potential so as to set the contract potential as obtained in step S53.

Figure 31:
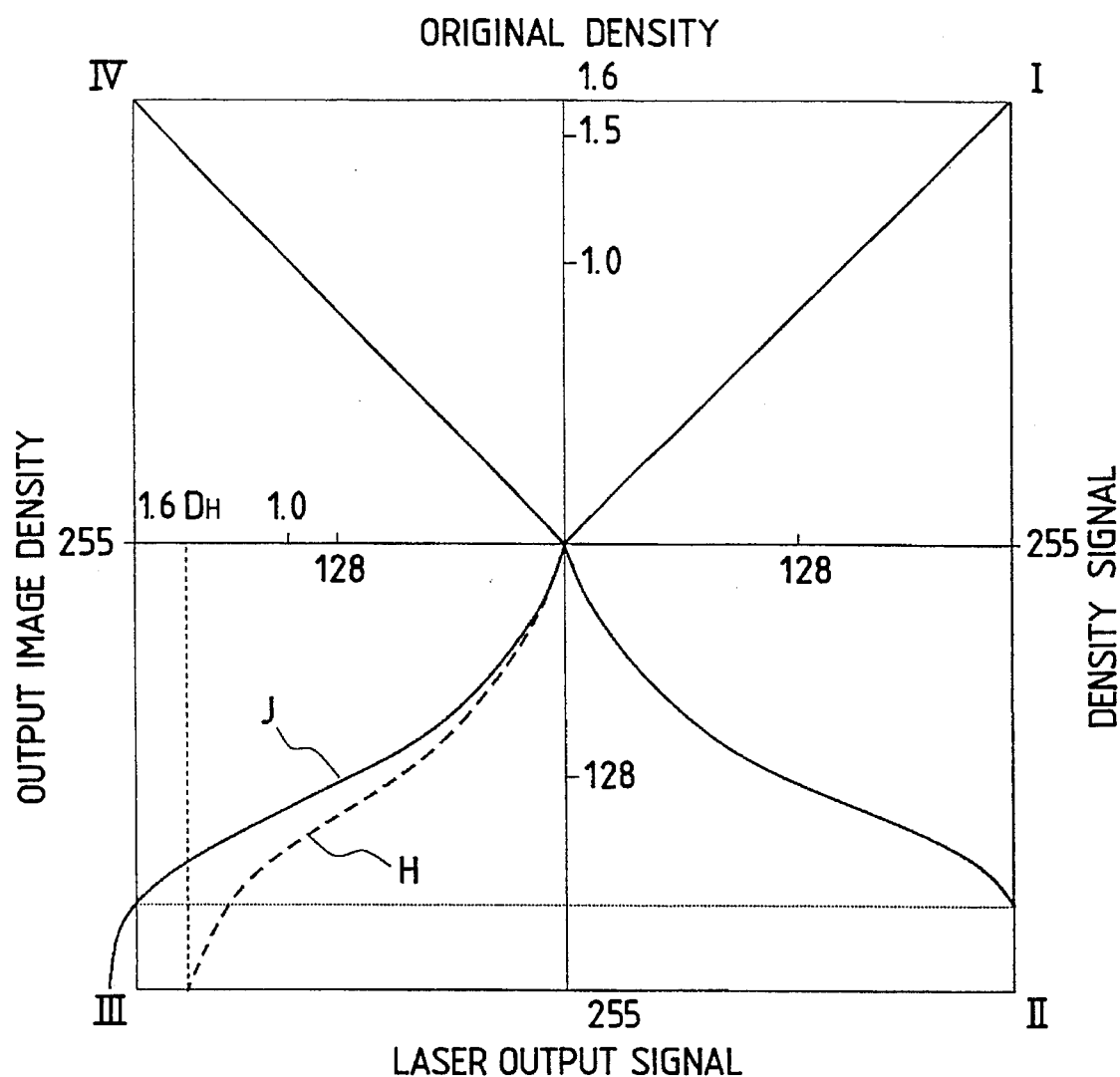
FIG. 31 is a diagram showing density converting characteristics.

FIG. 31 shows a density conversion characteristic diagram. A printer characteristic diagram of the III quadrant is as shown by a solid line J by the maximum density control to set the maximum density in the embodiment to a value that is slightly higher than the final target value.

If such a control is not performed, there is also a possibility such that printer characteristics which don't reach 1.6 as shown by a broken line H are obtained. In case of the characteristics of the broken line H, even when the LUT 25 is set to any table, since the LUT 25 doesn't have an ability to raise the maximum density, a density between the density $D_H$ and 1.6 cannot be reconstructed.

If the density is set to a value which slightly exceeds the maximum density as shown by the solid line J, a density reconstruction area can be certainly assured by the total gradation characteristics of the IV quadrant.

Figure 10A:
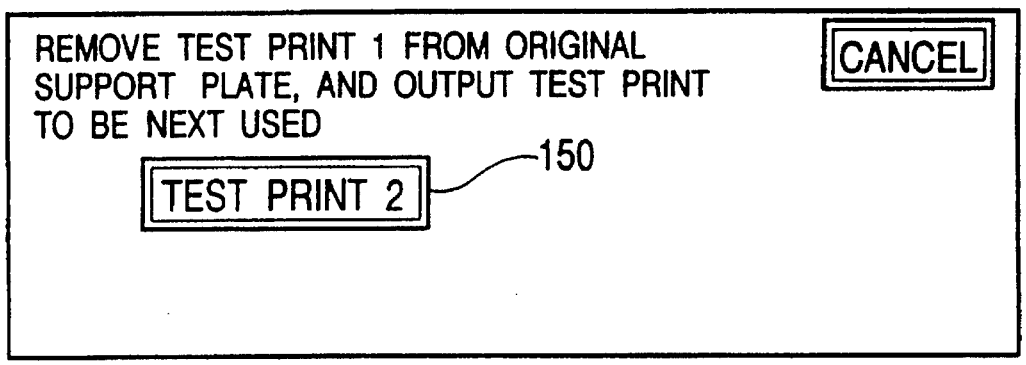
FIGS. 10A to 10E are diagrams showing display contents of the display 218.
Figure 10B:
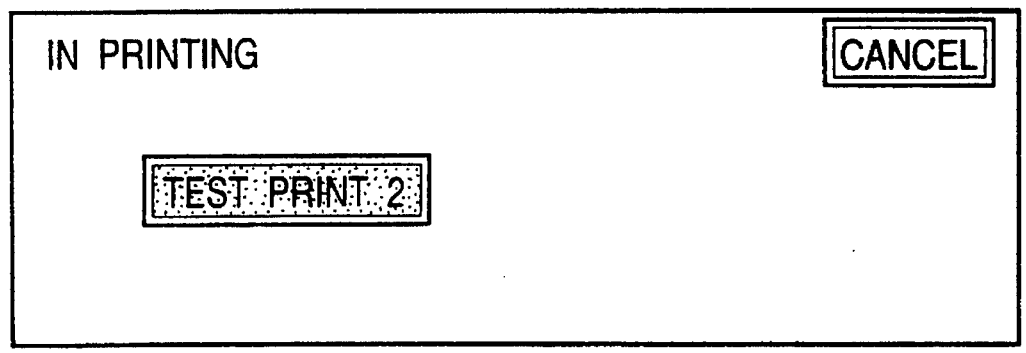
Figure 12:
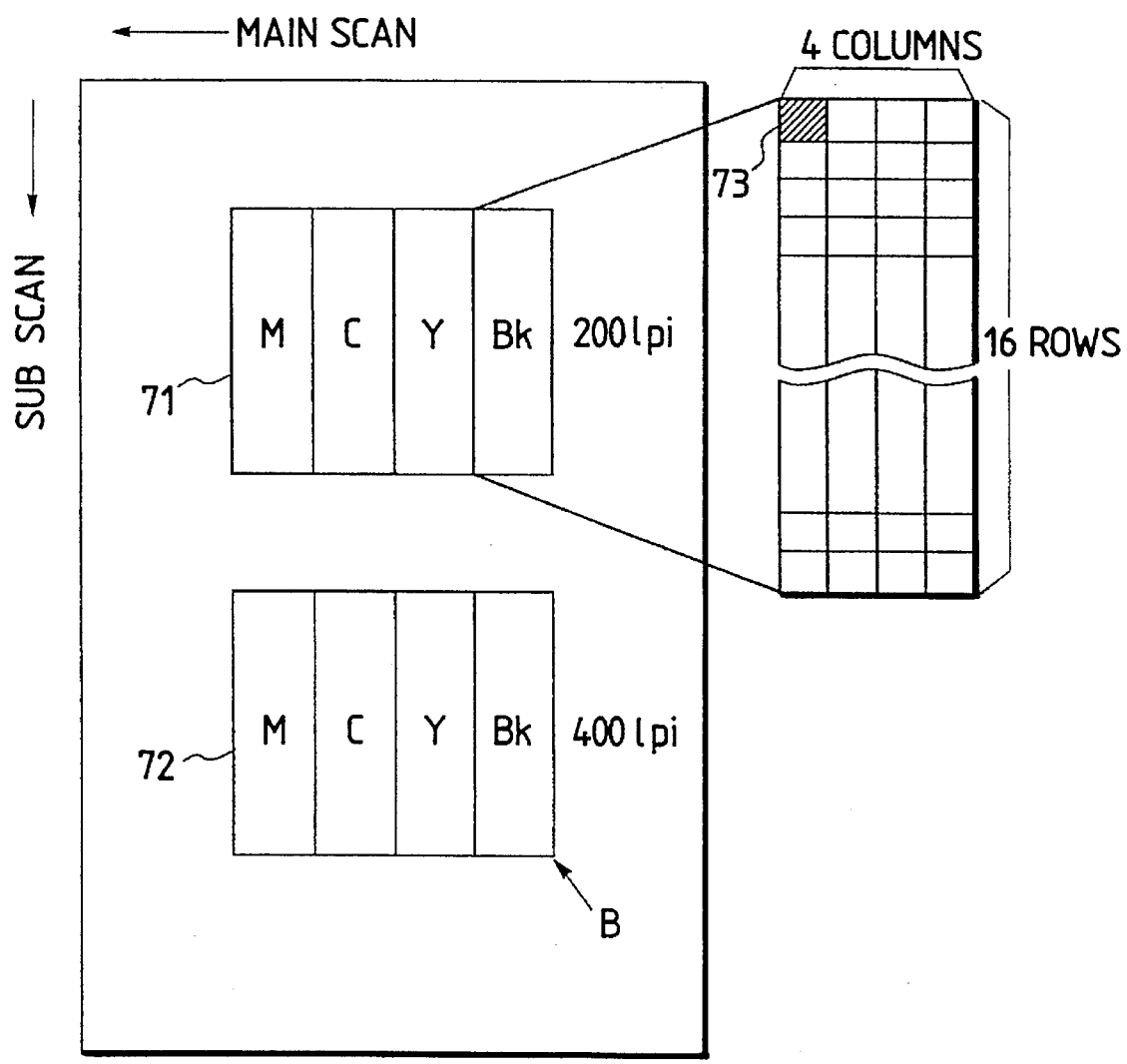
FIG. 12 is a diagram showing an example of a test print 2.

As shown in FIG. 10A, a print start button 150 of the image of the test print 2 appears on the operation panel. By depressing the button 150, the image of the test print 2 of FIG. 12 is printed out (S56). A display as shown in FIG. 10B is performed during the printing.

As shown in FIG. 12, the test print 2 is constructed by a group of patches of a total of 64 gradations of four columns and 16 rows of each of the colors of Y, M, C, and Bk. Among total 256 gradations, as for 64 gradations, the laser output level is preponderantly allocated to an area of a low density. In contrast, the laser output level is thinned out in an area of a high density. With such a method, the gradation characteristics in a highlight portion, particularly, can be preferably adjusted.

In FIG. 12, reference numeral 71 denotes the patch of a resolution of 200 lpi (lines/inch) and 72 indicates the patch of 400 lpi (lines/inch). To form the image of each resolution, in the pulse width modulation circuit 26, such an image can be realized by preparing a plurality of periods of a triangular wave which are used for comparison with the image data as a target to be processed.

In the image forming apparatus, a gradation image is formed at a resolution of 200 lpi and a diagram image such as a character or the like is formed at a resolution of 400 lpi. Patterns of the same gradation level are output by such two kinds of resolutions. However, in the case where the gradation characteristics largely differ due to a difference of the resolutions, it is more preferable to set the foregoing gradation level in accordance with the resolution.

The test print 2 is generated from the pattern generator 29 without making the LUT 25 function (the characteristics of the LUT 25 are linearly set).

Figure 10C:
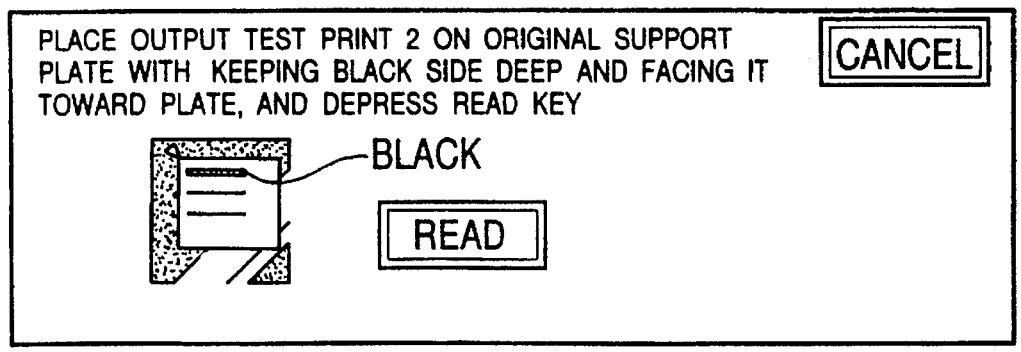
Figure 14:
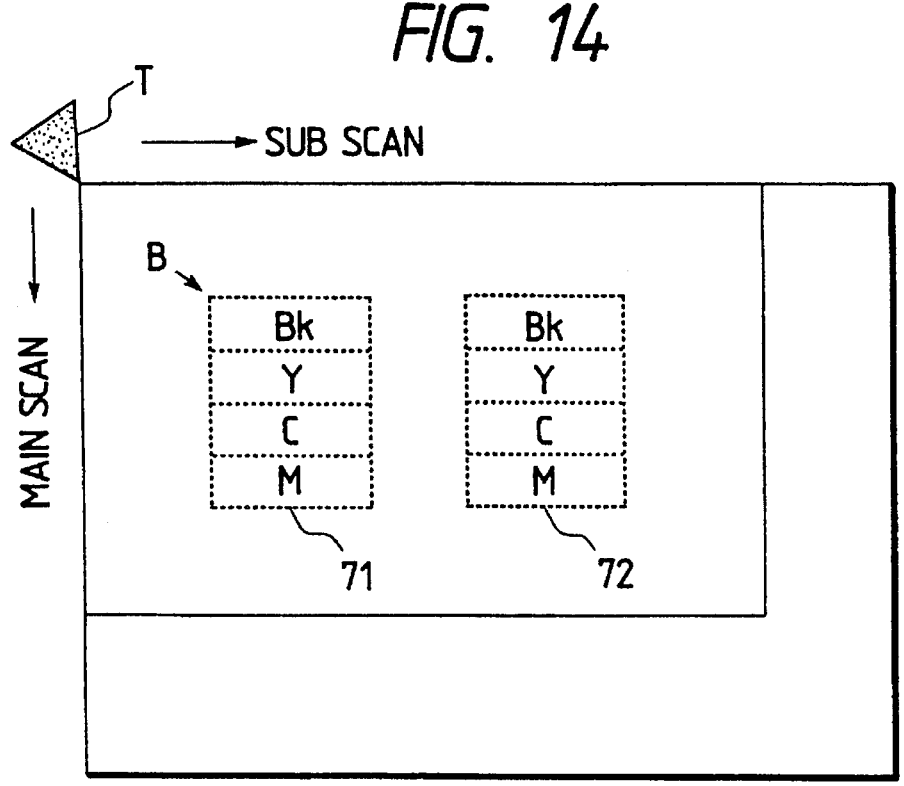
FIG. 14 is a diagram showing a placing method of the test print 2 on the original support plate.

FIG. 14 is a schematic diagram when the output of the test print 2 is placed on the original support plate glass 102 and is seen from an upper position. The left upper wedge-shaped mark T is a mark for original collision of the original support plate. A message is displayed on the operation panel in a manner such that the pattern of Bk is located on the collision mark T side and that the front and back surfaces are not erroneously placed (FIG. 10C). With such a method, a control error due to a mistake of placement can be prevented.

When reading the pattern by the reader unit A, the display screen is gradually scanned from the collision mark T and the first density gap point B is obtained. Therefore, the position of each color patch is determined as relative coordinates from the coordinates points and is read (S57).

Figure 18:
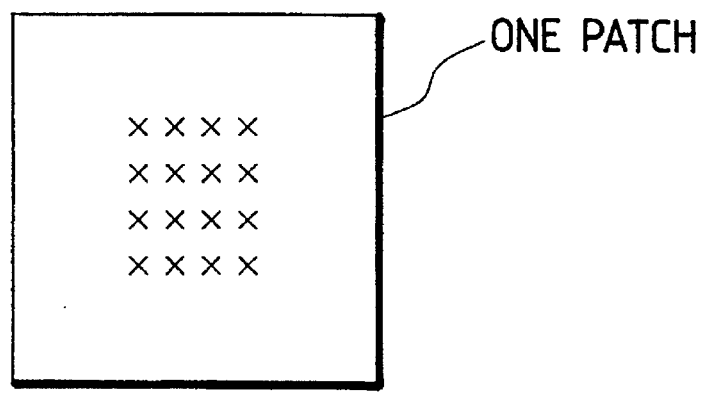
FIG. 18 is a diagram showing read points of a patch pattern.

As points which are read per one patch (73 in FIG. 12), as shown in FIG. 18, 16 read points (x) are set in the patch and an average of sixteen signal values obtained is calculated for every component of RGB. It is desirable to optimize the number of points in accordance with the reading apparatus, image forming apparatus, or size of patch.

The RGB signal in which the values of 16 points are averaged every patch is converted to the density value by the foregoing converting method to the optical density. The optical density is set to the output density and the laser output level is plotted on the axis of abscissa, so that a diagram as shown in FIG. 19 is obtained.

Further, as shown on an axis of ordinate on the right side, a base density of the paper (in the embodiment, 0.08) is set to 0 level and 1.60 set as a maximum density of the image forming apparatus is normalized to 255 levels.

In the case where the data obtained is such that the density is singularly high as shown at a C point or is low as shown at a D point, there is a case where there is dirt on the original support plate glass 102 or there is a defect in the test pattern. Therefore, an inclination is limited and a correction or calibration is made so as to keep a continuity in a data train. Specifically, when the inclination is 3 or more, it is fixed to 3. When the inclination has a minus value, the density level is set to the same density level as the previous level.

Figure 19:
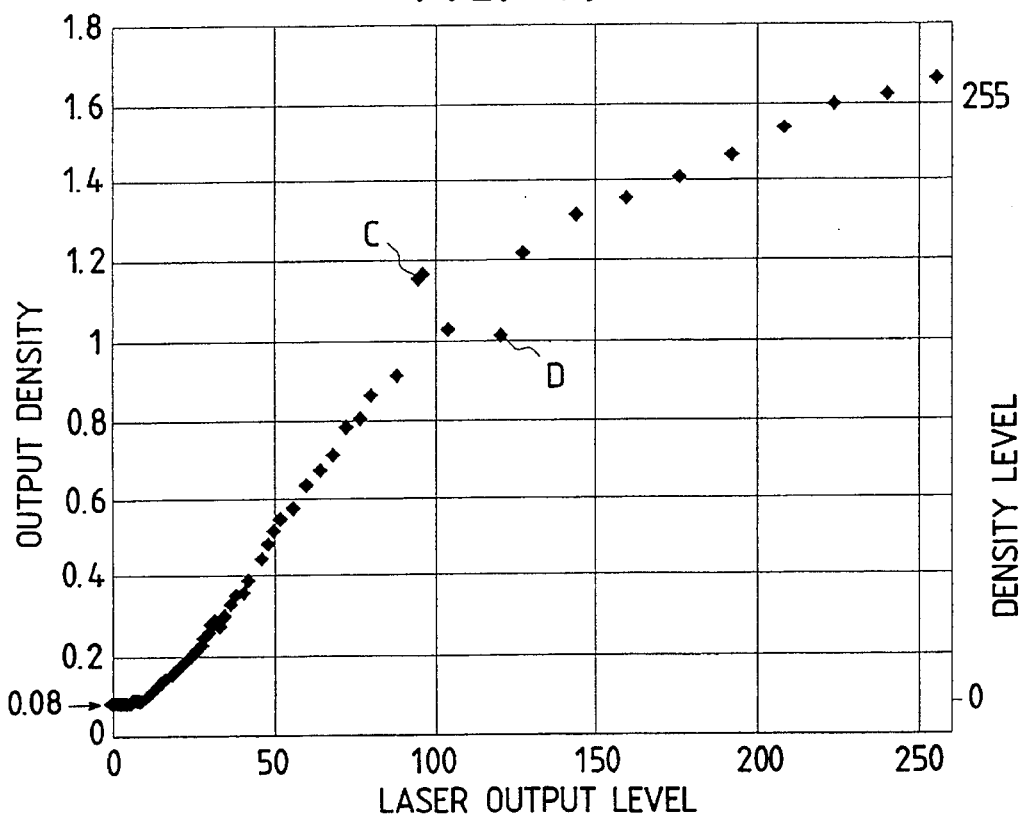
FIG. 19 is a diagram showing a read example of the test print 2.

As mentioned above, the contents of the LUT 25 can be easily formed by merely replacing the coordinates from the density level in FIG. 19 to the input level (axis of density signal in FIG. 6) and from the laser output level to the output level (axis of laser output signal in FIG. 6). With respect to the density level which doesn't correspond to the patch, the value is obtained by an interpolating arithmetic operation.

In this instance, limiting conditions are provided so as to set the output level to 0 level for the input level of 0 level.

The conversion contents formed as mentioned above in step S58 are set into the LUT 25.

Figure 10D:
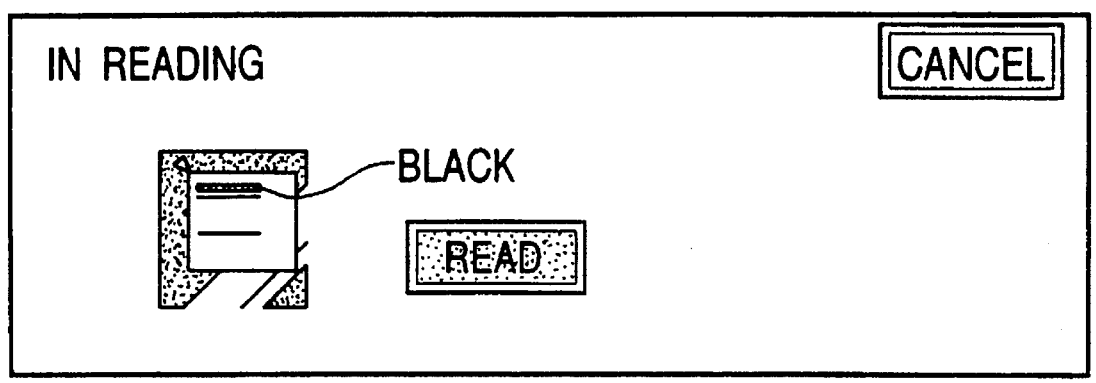
Figure 10E:
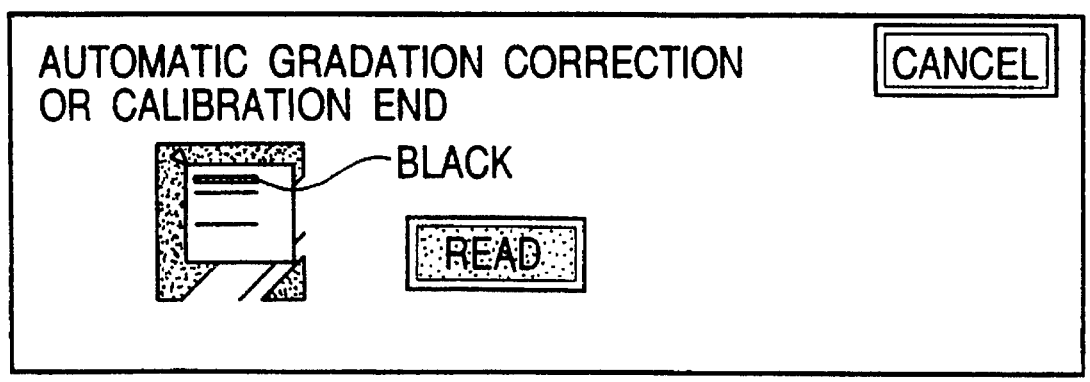

In this manner, the contrast potential control by the first control system using the read apparatus is executed and the gamma conversion table is formed. During the above process, a display as shown in FIG. 10D is executed and after completion of the display, display contents are displayed as shown in FIG. 10E.

A supplemental control for the gradation after completion of the control by the first control system will now be described.

In the image forming apparatus used in the embodiment, even when an environment fluctuates due to the foregoing contrast potential control, the maximum density can be corrected. However, a correction or calibration are also executed with respect to the gradation.

Figure 20:
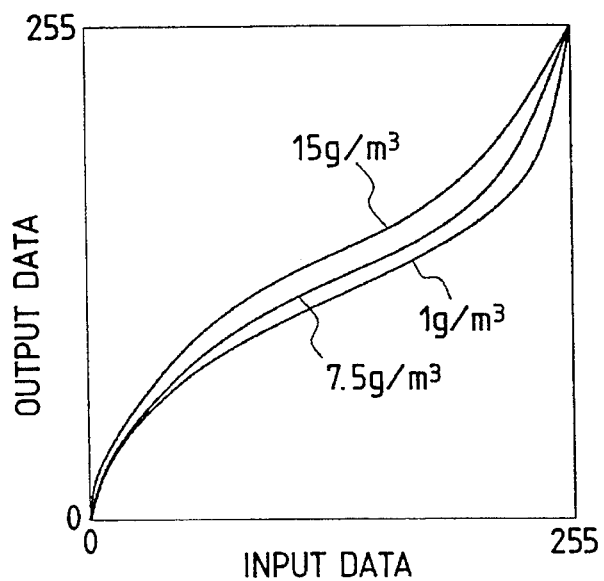
FIG. 20 is a diagram showing a LUT corresponding to each moisture amount.

In a state in which the first control system is made invalid, data in the LUT 25 shown in FIG. 20 of each environment is preserved in the ROM 30 in correspondence to the case where the environment changes.

Moisture amount data when the control by the first control system is executed is preserved and a LUT.A on the ROM 30 corresponding to the moisture amount is obtained.

Each time the environment changes after that, an LUT.B on the ROM 30 corresponding to the moisture amount at that time point is obtained. A LUT.1 obtained by the first control system is corrected by the following equation by using (LUT.B–LUT.A).

$$LUT.present = LUT.1 + (LUT.B - LUT.A) \qquad (4)$$

By such a control, the image forming apparatus is constructed so as to have linear characteristics for the density signal, so that a variation in density gradation characteristics of each machine is suppressed. A standard state can be set.

By enabling such a control to be used by the general user, by executing the above control as necessary at a time point when it is judged that the gradation characteristics of the image forming apparatus deteriorate, the correction or calibration of the gradation characteristics including both of the reader and the printer can be easily executed.

Further, the correction or calibration for the environmental fluctuation as mentioned above can also be properly performed.

The setting about valid/invalid of the first control system can be performed by the service man at the console unit 217. At the time of the service maintenance, by invalidating the first control system, the state of the image forming apparatus can be judged.

In case of invalidating, the apparatus is constructed in a manner such that a standard (default) contrast potential of such a kind of image forming apparatus and the gamma LUT 25 are accessed from the ROM 30 and set. In this instance, characteristics of the gamma LUT are linear (through).

By constructing as mentioned above, a degree of aberration of the characteristics from the standard state can be known at the time of a service maintenance. The optimal maintenance can be efficiently executed.

(Gradation control [calibration] of printer)

The second control system regarding the stabilization image reconstructing characteristics of the sole printer unit B will now be described. The second control system is automatically executed by the CPU 28.

Figure 21:
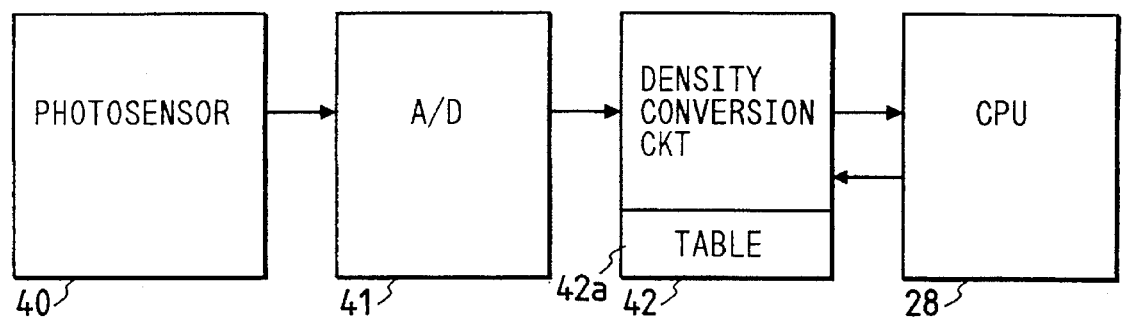
FIG. 21 is a flowchart from a photosensor 40 to a density conversion.

FIG. 21 shows a processing circuit for processing a signal from a photosensor 40 comprising the LED 10 and photodiode 11 which face the photosensitive drum 4. A near-infrared light from the photosensitive drum 4 which enters the photosensor 40 is converted to an electric signal by the photosensor 40. The electric signal is supplied to an A/D conversion circuit 41, by which an output voltage of 0 to 5 V is converted to a digital signal of 0 to 255 levels. The digital signal is further converted to the density by the density conversion circuit 42.

Color toners of yellow, magenta, and cyan are used in the embodiment. The toner is formed by dispersing a color member of each color by using a copolymer resin of the styrene system as a binder.

Figure 22:
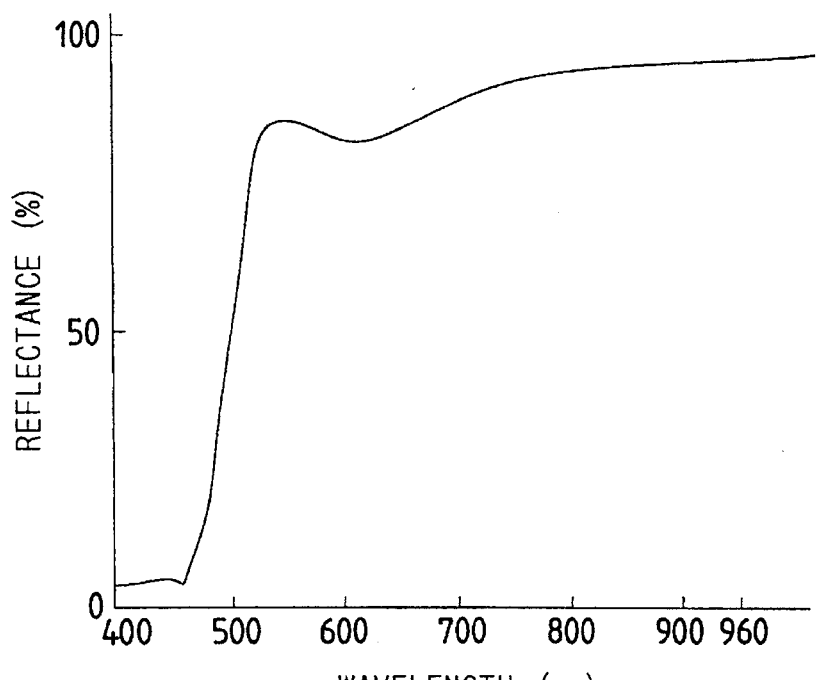
FIG. 22 is a spectral characteristic diagram of a yellow toner.
Figure 23:
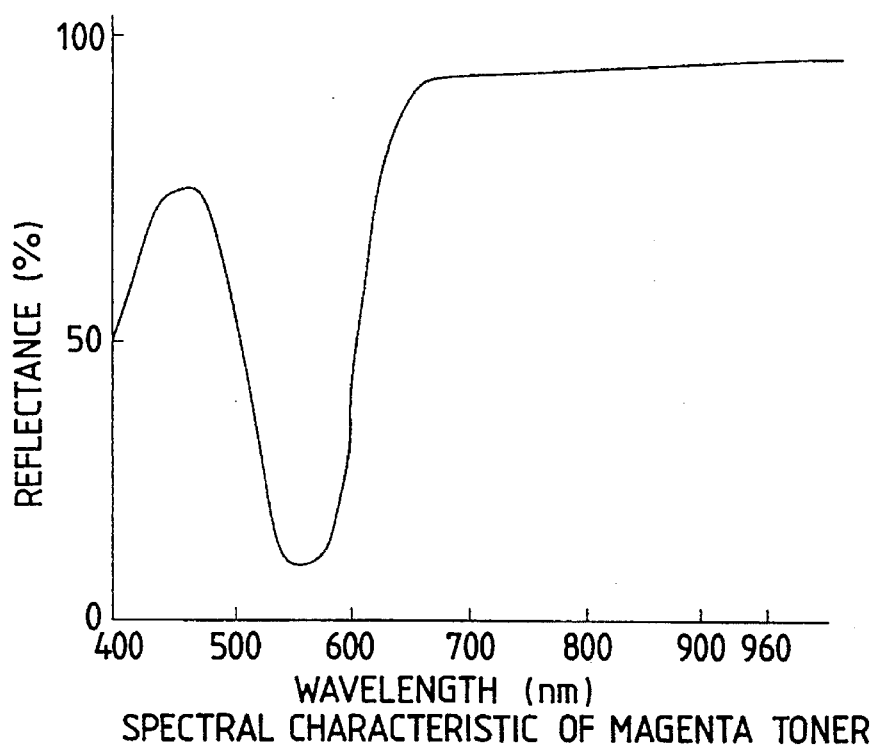
FIG. 23 is a spectral characteristic diagram of a magenta toner.
Figure 24:
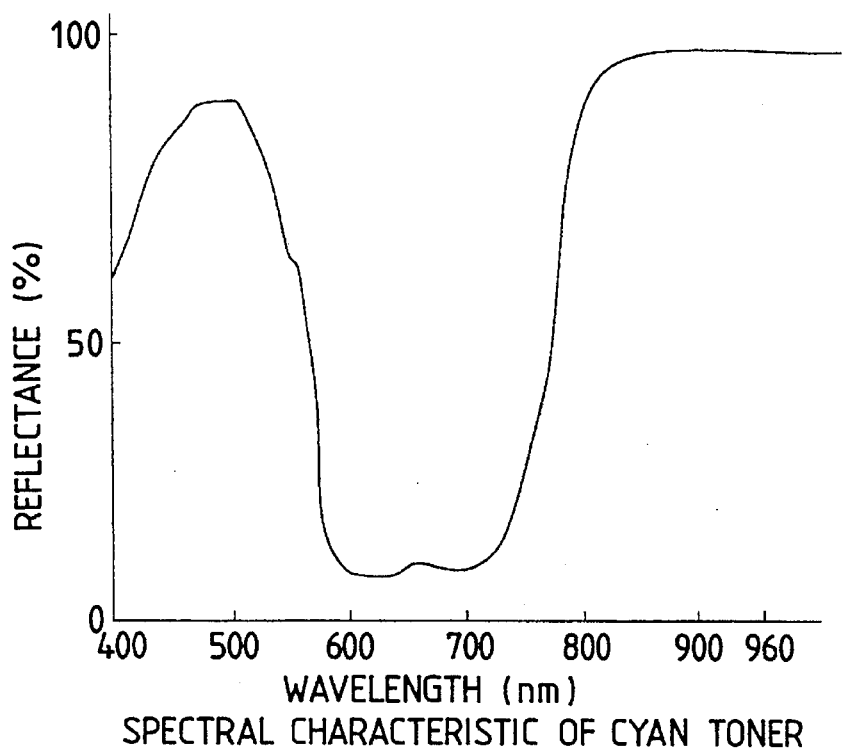
FIG. 24 is a spectral characteristic diagram of a cyan toner.

Spectral characteristics of the yellow, magenta, and cyan toners are shown in FIGS. 22 to 24 in accordance with this order. As shown in those diagrams, a reflectance of 80% or more is obtained for the near-infrared light (main wavelength is set to 960 nm). In the formation of those color toner images, a 2-component development system that is advantageous for color purity and permeability is used.

Figure 25:
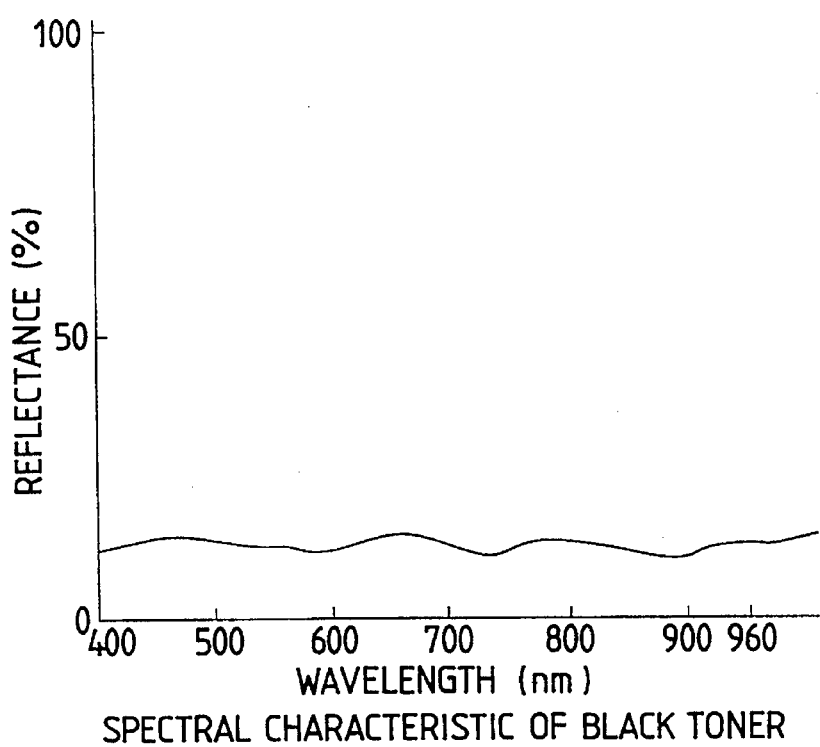
FIG. 25 is a spectral characteristic diagram of a black toner.

In the embodiment, although the black toner is based on the same 2-component development system, carbon black is used as a color member in order to express pure black. Therefore, as shown in FIG. 25, a reflectance of the near-infrared light (main wavelength: 960 nm) is equal to about 10%.

The photosensitive drum 4 is an OPC drum and a reflectance of the near-infrared light (main wavelength: 960 nm) is equal to about 40%. So long as the reflectances are almost equal, a drum of the amorphous silicon system or the like can also be used.

Figure 26:
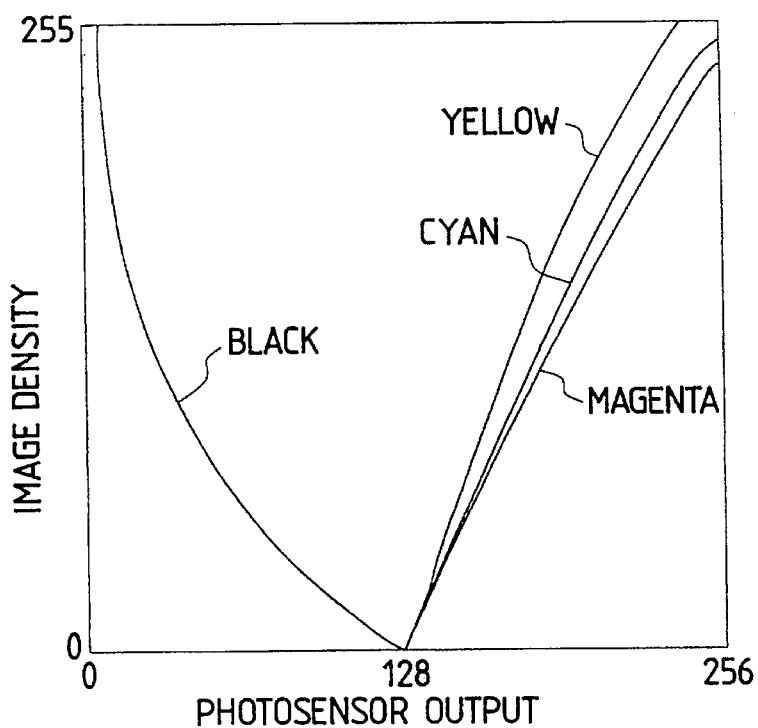
FIG. 26 is a diagram showing the relation between a photosensor output and an image density.

FIG. 26 shows the relation between the output of the photosensor 40 and the output image density when the density on the photosensitive drum 4 is changed step by step in accordance with an area gradation of each color.

An output of the sensor 40 in a state in which no toner is deposited on the photosensitive drum 4 is set to 2.5 V, namely, the 128 level.

As will be understood from FIG. 26, as an area coating ratio increases and the image density rises for each of the toners of yellow, magenta, and cyan, the output of the photosensor 40 is larger than that of the sole photosensitive drum 4.

On the other hand, in case of the black toner, as an area coating ratio increases and the image density increases, the output of the photosensor 40 is smaller than that of the sole photosensitive drum 4. From those characteristics, by having a table 42a for converting to the density signal, the density signal can be accurately read out for every color from an output signal of an exclusive-use sensor for each color.

Figure 27:
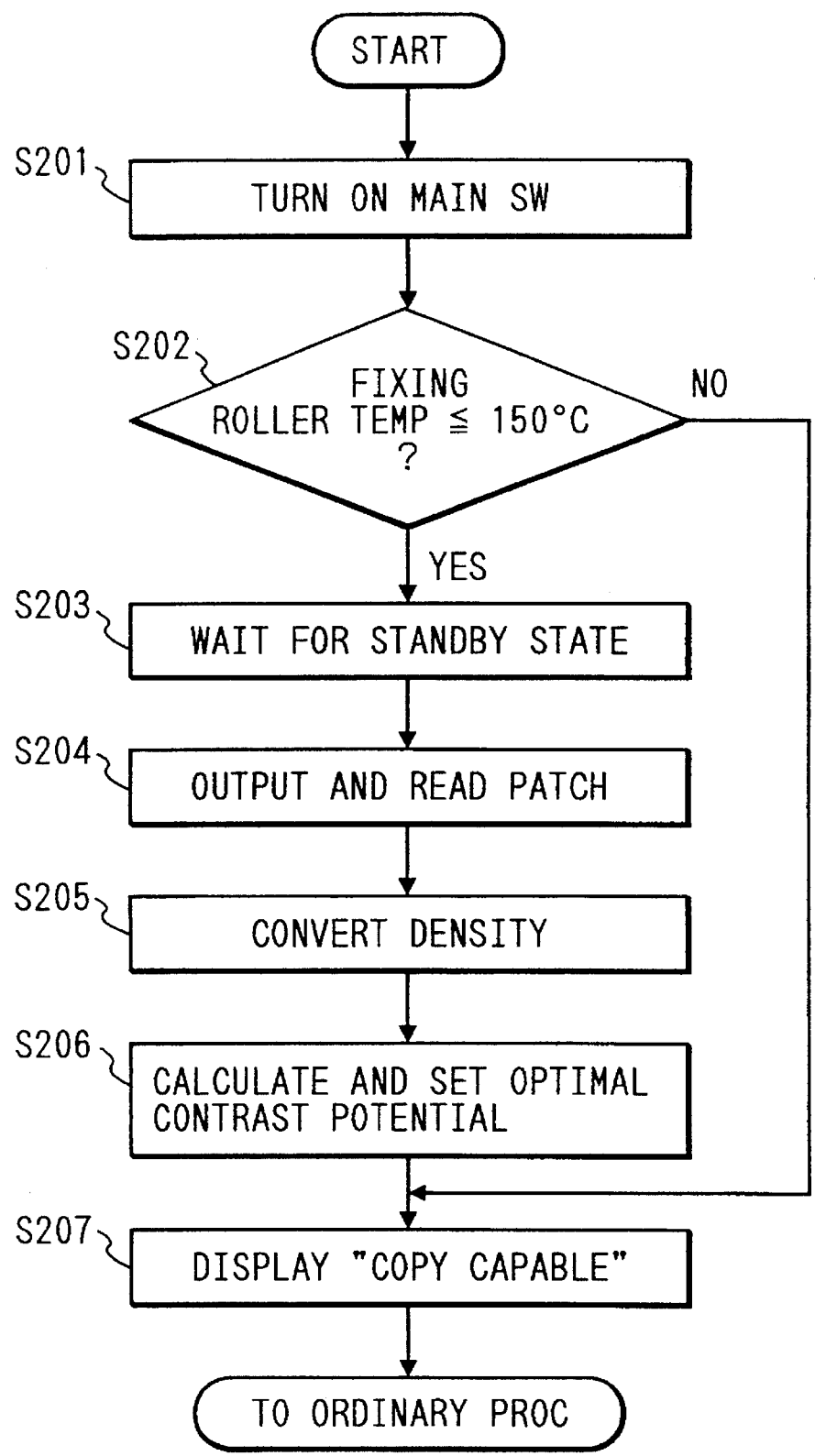
FIG. 27 is a flowchart for a second control system.

A flow of the second control system will now be described with reference to FIG. 27. Such a control is realized by the CPU 28.

When a main power switch is turned on (step S201), if a temperature of a fixing roller is equal to or lower than 150° C., the control by the second control system is executed (S202).

When a fixing temperature is equal to or lower than 150° C., the temperature of the fixing roller is set to a predetermined temperature and a laser temperature also reaches a temperature adjustment point. In order to set the foregoing contrast potential, a potential measurement control to measure potential data is performed. Until a toner tribology becomes stable, the developing device is shut down and the apparatus waits until it enters a standby state (S203).

When the apparatus enters the standby state, a patch pattern of each of the colors of Y, M, C, and Bk is formed on the photosensitive drum and is detected by the photosensor 40 (S204).

As a laser output of the patch, the 128 level is used as a density signal (axis of density signal in FIG. 6) for each color. In this instance, when setting the contents of the LUT 25 and the contrast potential, those obtained in the first control system are corrected and used by using the moisture amount at that time point.

In a state in which the first control system is invalid, the LUT 25 registered in a ROM 80 and the contrast potential which were led from the moisture amount as a standard state are used.

Figure 28:
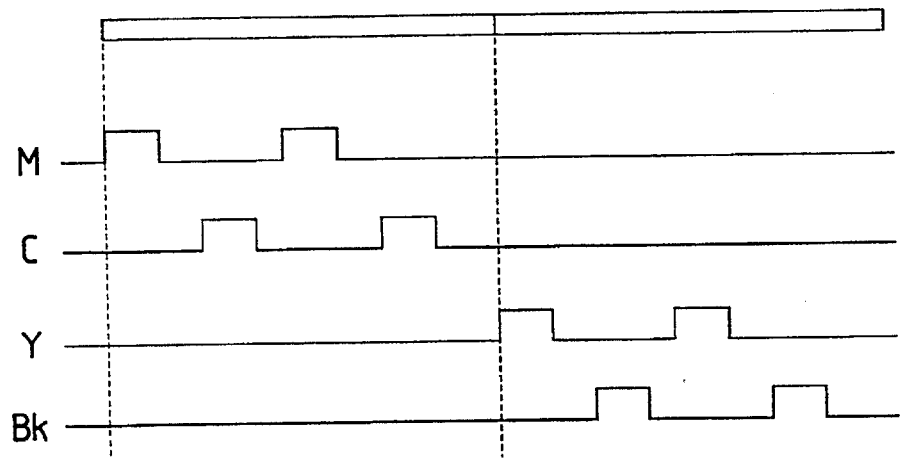
FIG. 28 is a diagram showing a detection example according to the second control system.

A sequence to form patches onto the photosensitive drum 4 is executed as shown in FIG. 28.

First, a gradation patch of magenta is formed at the first rotation of the photosensitive drum. A gradation patch of cyan is subsequently formed. By repeating the above operations twice, every two same gradation patches are formed in one cycle with respect to each color.

In the embodiment, since the photosensitive drum 4 of a large diameter is used, in order to accurately and efficiently obtain the density data in a short time, the patches of the same color are formed at the positions which face by an angle of 180° on the photosensitive drum in consideration of an eccentricity of the photosensitive drum. A plurality of sampling operations are executed with respect to the patch of the same color, thereby obtaining an average.

By forming patches of different colors so as to sandwich the above-mentioned patch, data of two colors is obtained per one cycle.

As mentioned above, data of four colors are obtained per two cycles and density values are obtained by using the density conversion table 42a in FIG. 26.

As mentioned above, in the second control system, for instance, a good control can be performed by forming a gradation pattern different from that of the first control system in consideration of the characteristics of the printer such as an eccentricity of the photosensitive drum or the like.

Figure 29:
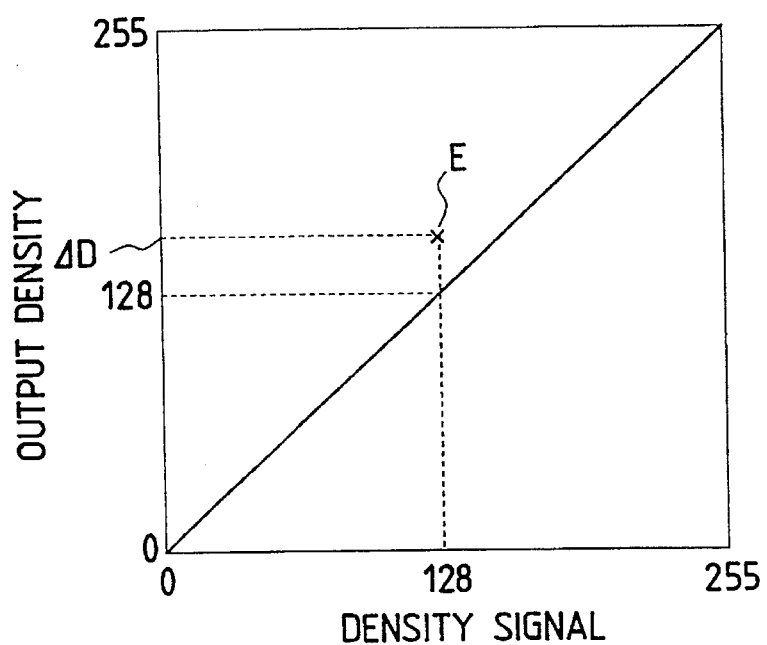
FIG. 29 is a diagram showing a patch forming sequence in the second control system.

FIG. 29 shows the relation between the density signal and the output.

Since an output density has been controlled by the first control system so as to be 128 at a density scale in which 1.6 is normalized to 255. Therefore, in the case where the measured result is deviated by only $\Delta D$ as shown at an E point, a density signal 128 is obtained by the following equation (5).

$$Vcont.correct= Vcont.present \times 128/(128+\Delta D) \qquad (5)$$

In a manner similar to the first control system, by having a correction coefficient Vcont.rate2= Vcont.correct/Vcont.present even if the environment fluctuates, a correction or calibration is executed on the basis of the contrast potential according to the environment preserved in the ROM 30 (S206).

After completion of the above control, a message "copy capable" is displayed on the foregoing operation panel and the apparatus is set to the copy standby state (S207).

The control by the second control system is completed by the operations as mentioned above.

In many cases, generally, the power source of the image forming apparatus is turned off at night and is turned on in the morning. Therefore, in many cases, the second control system is activated once a day.

On the other hand, it is not presumed that the calibration by the first control system is frequently executed because it is normally performed at the time of installation.

Therefore, the service man executes the calibration of the first control system when installing the image forming apparatus. If no problem occurs in the image, the characteristics are automatically maintained by the calibration by the second control system in a short period of time. On the other hand, the characteristics which gradually changed for a long period of time are corrected by the calibration by the first control system. In this manner, roles can be divided. Thus, the gradation characteristics can be maintained until the life of the image forming apparatus expires.

A construction of the photosensor 40 used in the second control system will now be described.

In dependence on the use durability of the image forming apparatus, there occurs a case where the density obtained by reading the pattern on the photosensitive drum 4 by the photosensor 40 doesn't coincide with the density of the image which was actually printed out.

For example, the cleaning blade to clean the transfer residual toner comes into contact with the photosensitive drum 4 and rubs the drum surface for a long time, so that the surface of the photosensitive drum 4 becomes coarse and the scattered light components of the photosensitive drum increase. Thus, the relation between the output of the photosensor 40 and the image density changes from the initial state.

Figure 30:
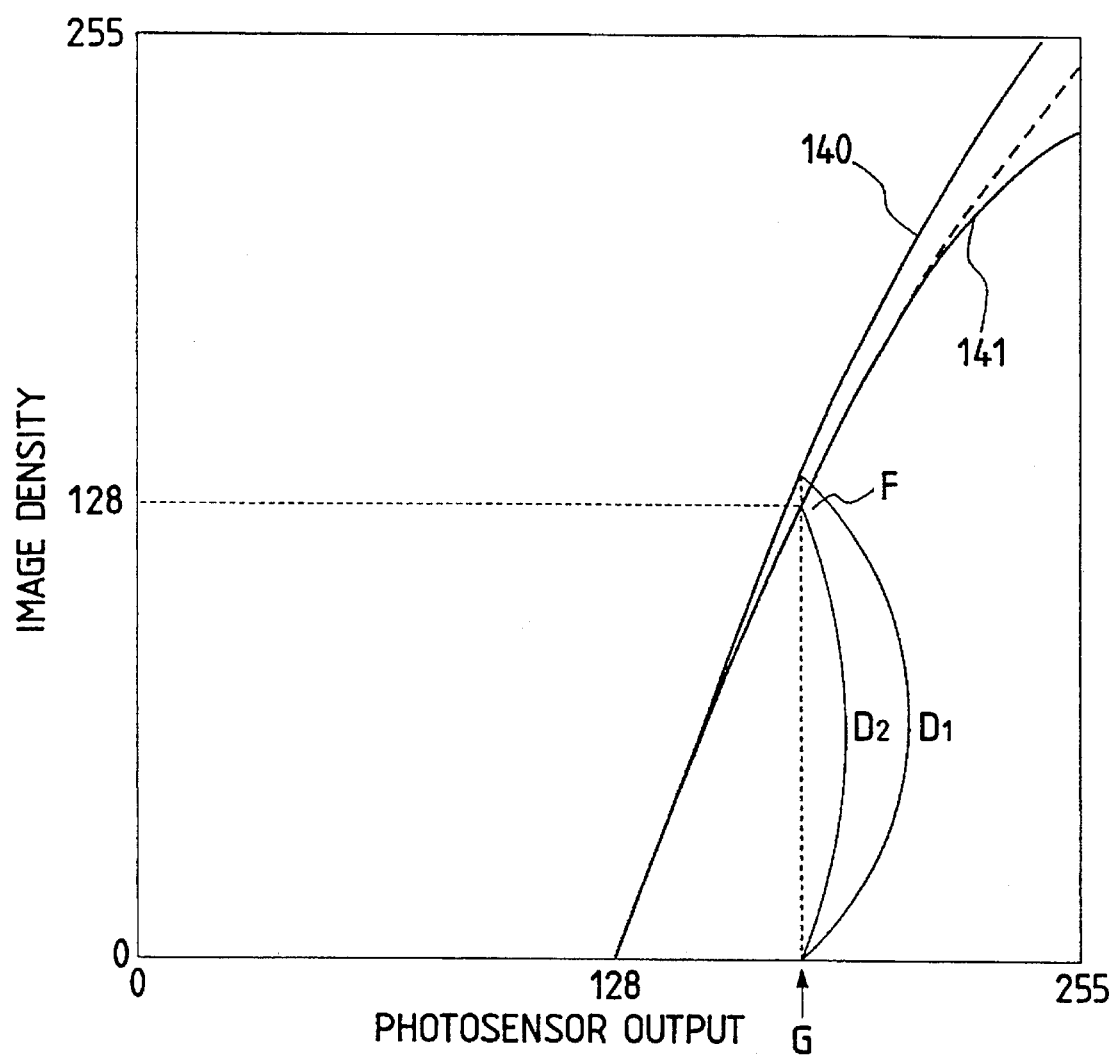
FIG. 30 is a diagram showing a durability characteristic change of a density conversion table of a photosensor 40.

FIG. 30 shows an example of the case for yellow.

A curve 140 shows characteristics in the initial state of the photosensitive drum. A curve 141 shows characteristics after 20000 images are formed.

There is a tendency such that even in the case of the same sensor output, the image density decreases.

There is a case where even when the foregoing control is executed in a state in which the relation between the sensor output and the image density doesn't match, good gradation characteristics are not derived.

After completion of the operation of the first control system, patches in the second control system are formed on the photosensitive drum at a level (the 96 level is used in the embodiment) near the output density level 128 at the level of the gradation patch in the first control system and are detected by a reading sequence.

An F point is obtained from the correspondence between the density value which was read by the first control system and the output of the photosensor 40.

The curve 140 has been stored as a conversion table in the ROM 30. A density corresponding to the photosensor output at a G point is equal to D1. A density corresponding to the G point after durability is equal to D2. Therefore, by multiplying a ratio of D2/D1 for the curve 140, conversion characteristics in a durable state can be obtained and used for correction or calibration.

According to the embodiment as described above, in the image forming apparatus to form a monochromatic image or a color image onto the recording member, the apparatus comprises: image reading means for reading the original on the original support plate and digitizing it; control means for controlling the reading conditions in accordance with a change in reading conditions in the image reading means; means for forming the toner image on the image holding member on the basis of the image information read by the image reading means; reading means for optically reading the reflection density of the toner image formed; means for transferring the toner image on the image holding member onto the recording member; and means for fixing the toner image on the recording member, wherein the image forming apparatus further includes: a first control system for forming at least one or more image patterns to judge the image characteristics, reading such an image pattern by the image reading means, and controlling the image forming conditions on the basis of the read data; and a second control system for forming at least one or more image pattern toner images to judge image characteristics onto the image holding member, optically reading the reflection density of the toner image formed by the reading means, and controlling the image forming conditions on the basis of the read data. Therefore, there is an effect such that the gradation characteristics can be maintained for a long time.

Particularly, the calibration by the first control system which needs to be performed by the operator is manually executed for a long period of time. The calibration by the second control system is automatically executed. Thus, the characteristics of the printer which easily fluctuate can be automatically stabilized.

According to the embodiment, there is provided the image forming apparatus comprising: means for reading an original on the original support plate and digitizing; means for forming an image on the basis of the digital image signal; and means for forming at least one or more image patterns for judging the image characteristics, placing the pattern image after it was output onto the original support plate, reading the image information, and controlling the image forming conditions by the information, wherein in the first step, the image pattern of the maximum image density of the image forming apparatus is formed, the formed recording image is placed onto the original support plate of the reading apparatus and is read, and the image forming conditions are controlled so as to be slightly higher than the target maximum density of the image forming apparatus on the basis of the read image information, and in the second step, the image pattern indicative of the density gradation is formed, the recording image formed is put on the original support plate of the reading apparatus and is read, and by controlling the image forming conditions on the basis of the read image information so that the gradation characteristics are set to constant characteristics, so that there are effects such that the output density range of the image forming apparatus is always set to the same state and the stable gradation characteristics in a range from the highlight to a shadow can be always set to the same state.

When the patch of the maximum density is read, the maximum density can be also obtained as an average value of a plurality of points (for instance, three points). In the case where there are density gradients in the thrust direction and circumferential direction of the photosensitive drum 4, a density difference among the patches occurs. Therefore, when the detected density difference is larger than the set level, it is judged that there are some abnormalities in the positional precision of the photosensitive drum, positional precision of the primary charging device, positional precision of the developing device, and the like. A message to urge the inspection is displayed on the display 218 as an error message and the control can be also interrupted.

Figure 32:
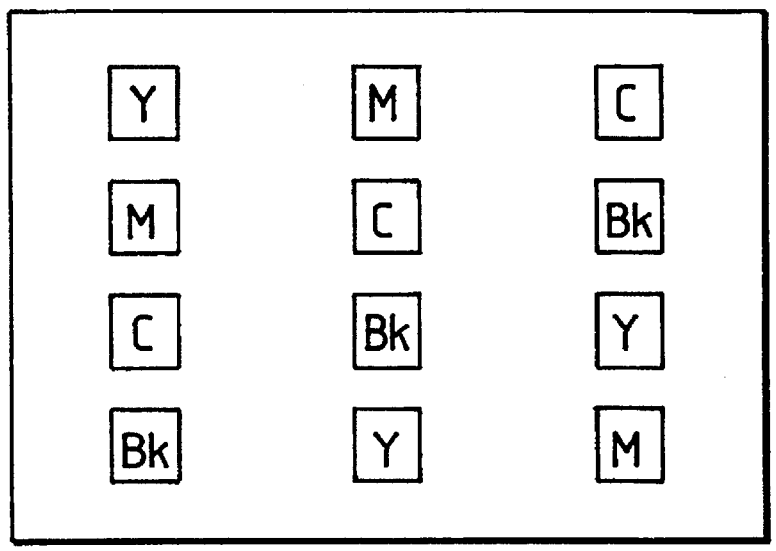
FIG. 32 is a diagram showing an example of a patch.
Figure 33:
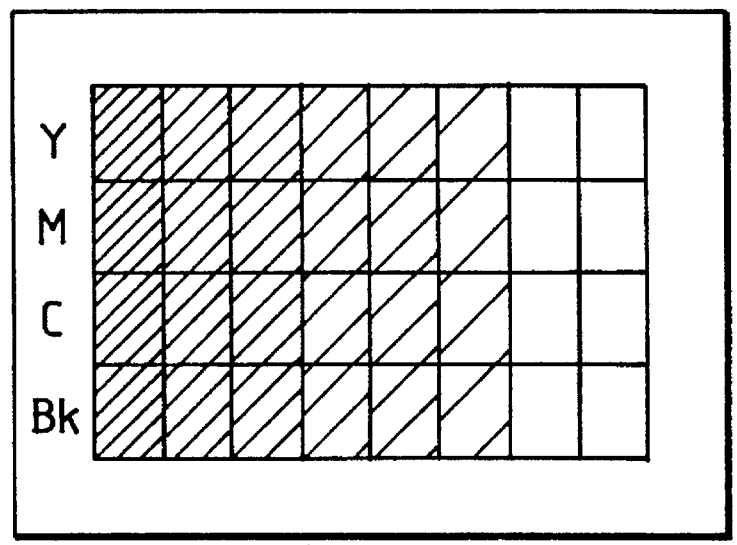
FIG. 33 is a diagram showing an example of a patch.

A plurality of patches of the maximum density of respective colors are formed as shown in FIG. 32 and an average can also be obtained. In the test print 2, the respective colors can also be arranged in a line in the sub scan direction as shown in FIG. 33.

In the above embodiment, although the density information has been obtained by using the equation (2), an output of the LOG conversion circuit 206 can also be used as density information. In this case, when the yellow density is measured, the value in which a signal of its complementary color, namely, blue is logarithmically converted and used. In case of the magenta density, a green signal is used. In case of the cyan density, a red signal is used. In case of the black density, although any color can be used in principle, the green signal can be used in consideration of spectral luminous efficiency characteristics.

In the above example, although Vcont has been corrected and calibrated by the second control system, by providing one more LUT similar to the LUT 25, the gamma correction or calibration can be also controlled by the second control system. As mentioned above, by providing a plurality of gamma correction table, the gradation characteristics of the printer which fluctuated by the use can be automatically adjusted in a short period of time.

A target of the adjustment by the second control system is not limited to Vcont but may be another processing condition such as driving time or the like of a hopper screw in the toner supply control in the developing device.

Second Embodiment

Figure 34:
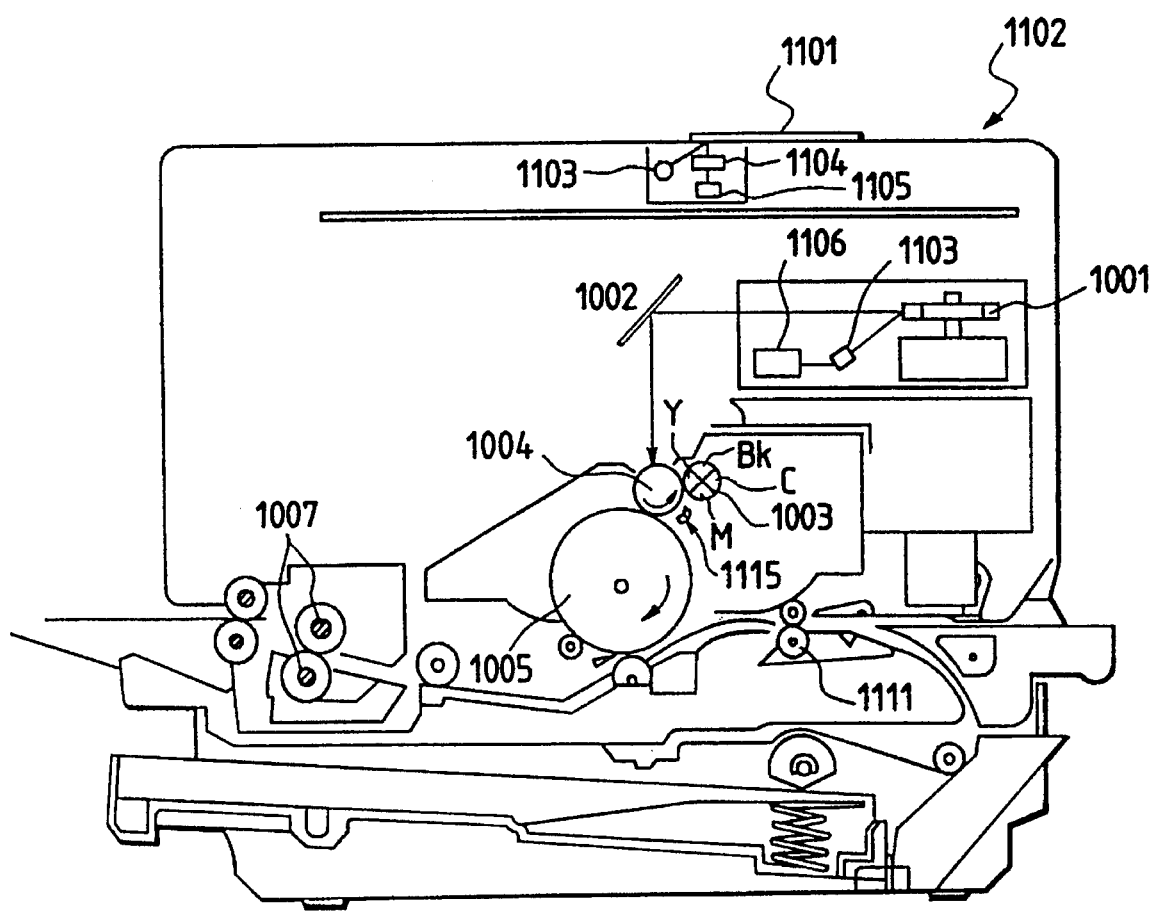
FIG. 34 is a diagram showing a construction of an embodiment 2 of the invention.

FIG. 34 shows a construction of an image forming apparatus of the second embodiment. In the embodiment, an image signal is converted to a laser beam through a laser driver and a laser light source (not shown). The laser beam is reflected by a polygon mirror 1001 and a mirror 1002 and is irradiated onto a photosensitive drum 1004. The photosensitive drum 1004 on which a latent image was formed by scanning the laser beam is rotated in the direction of the arrow shown in the diagram. Thus, a development of each color is executed by a rotary developing device 1003 (FIG. 34 shows the development by the yellow toner).

On the other hand, a recording member is wrapped around a transfer drum 1005 and each time the drum is rotated once, the recording member is also rotated one by one in accordance with the order of M (magenta), C (cyan), Y (yellow), and Bk (black) and the toner image is transferred to the recording member from the photosensitive drum 1004 developed by the rotary developing device 1003. The transfer operation is finished after the drum 1005 is rotated four times.

After completion of the transfer, the transfer paper is separated from the transfer drum 1005 and is fixed by a fixing roller pair 1007 and a color image print is completed.

The second embodiment differs from the foregoing embodiment with respect to a point that the rotary developing device is used.

Since a circuit construction for image processes is similar to that in the foregoing embodiment, its description is omitted.

Figure 35:
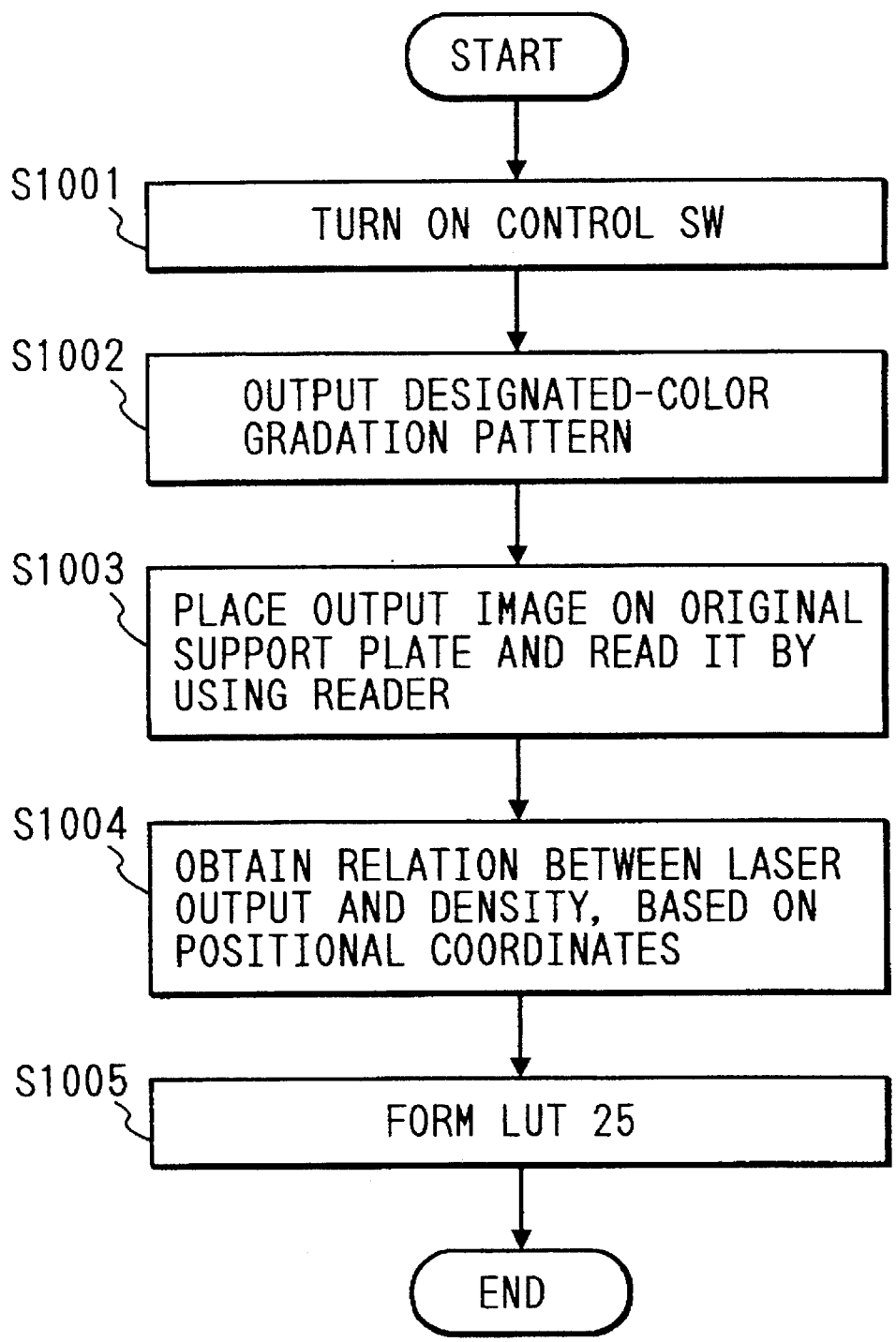
FIG. 35 is a flowchart for the embodiment 2.
Figure 36:
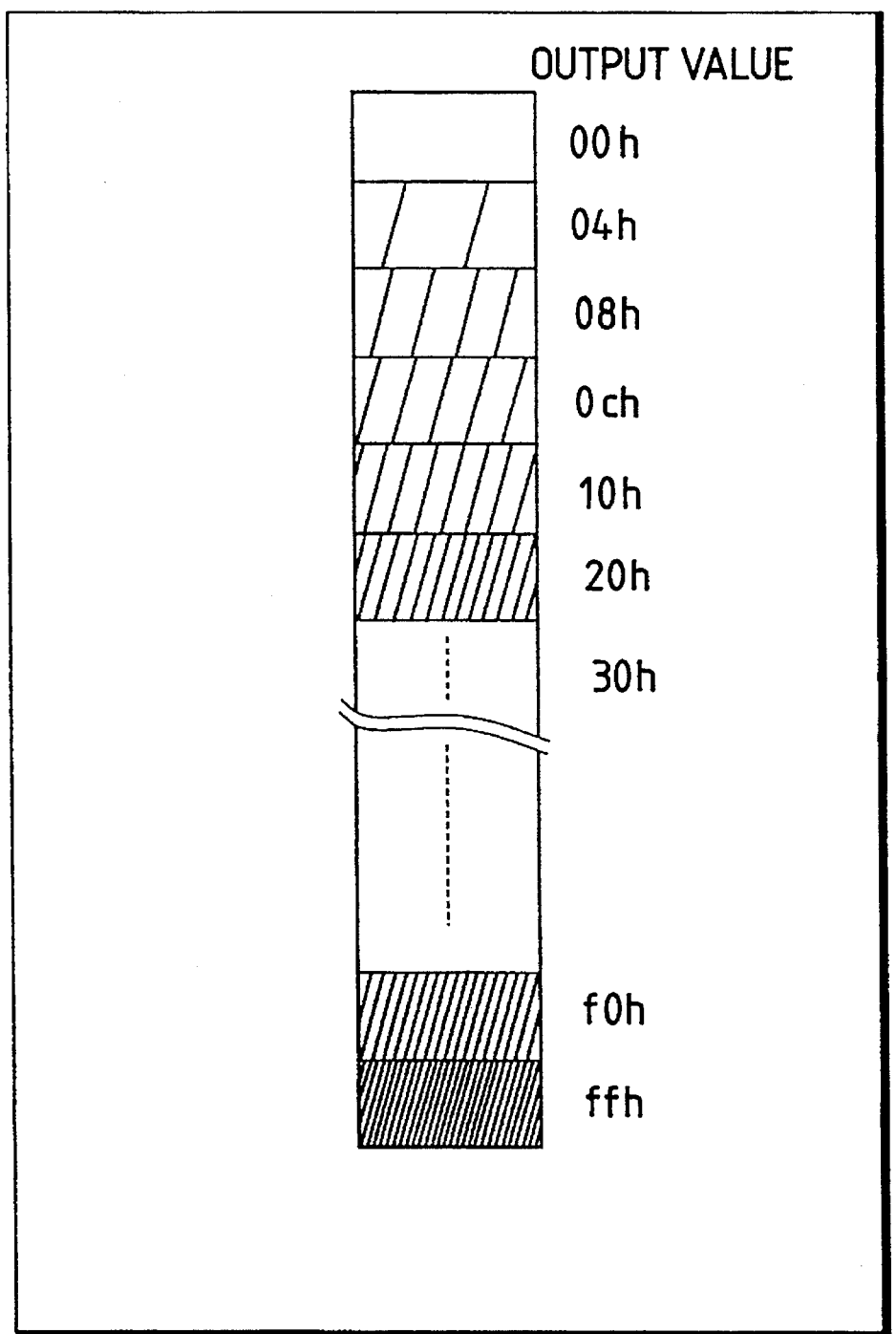
FIG. 36 is a diagram showing a test print which was printed out in the embodiment 2.

FIG. 35 shows a flow for the embodiment. When a specific color in which it was judged that there is an abnormality in the gradation characteristics is designated and a start switch of the control is turned on the operation panel 217 (S1001), as shown in FIG. 36, a gradation pattern image having a large amount of portion in which the gamma characteristics of the designated color are not linear (having a small step width) is formed on the recording member and is printed out (S1002). After that, the processes in steps S1003 to S1005 are executed in a manner similar to the foregoing embodiment.

Figure 37:
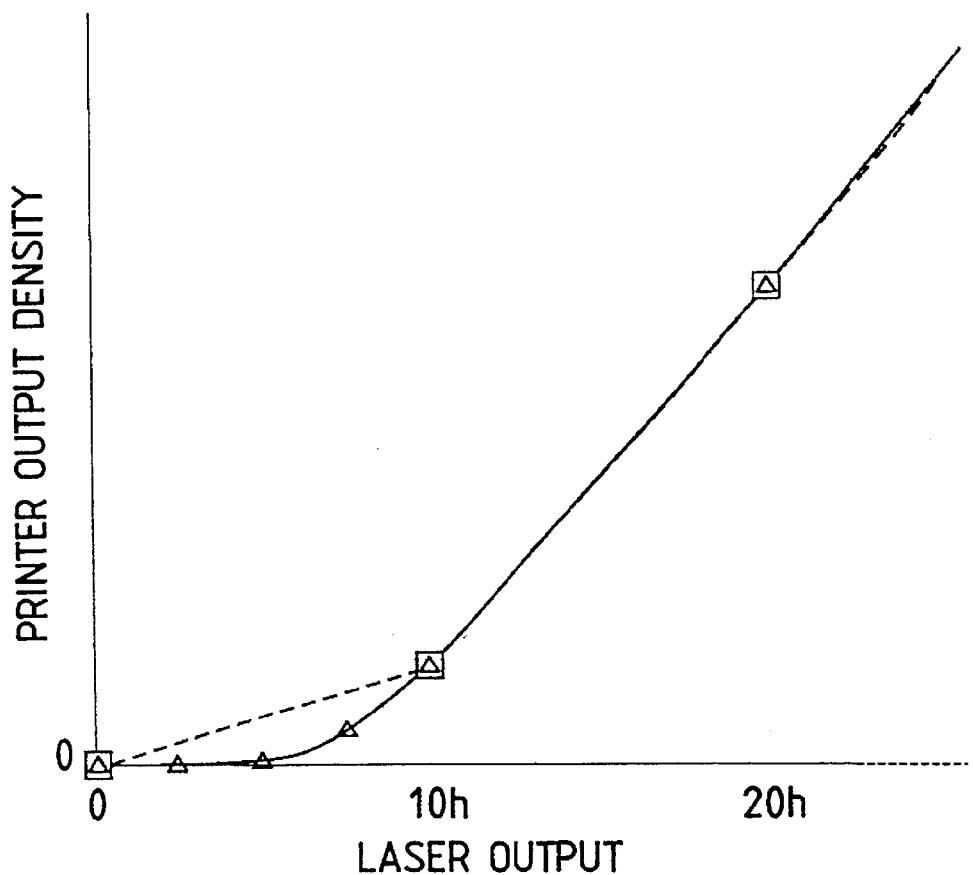
FIG. 37 is an explanatory diagram of measurement points.

As shown in FIG. 37, when a portion in which the gamma characteristics are not linear is interpolated, the density differs from the actual density as shown by a broken line in the diagram. Therefore, in the embodiment, the portion in which the gamma characteristics are not linear is densely eliminated, thereby reducing the difference with the actual density (FIG. 38). That is, in a density range in which the gradation characteristics are substantially more linear, the number of patches is reduced more than that of the other density range.

In the embodiment, when the LUT is formed, a primary interpolation has been performed in order to produce the LUT data during such a period of time. However, in order to improve precision, it is preferable to execute a higher-order interpolation or a higher-order approximation. The LUT 25 is calculated and set by using the resultant data and the gradation performance can be improved.

By executing the above control, the number of steps of the patches can be set to a large value in the density range in which the gradation characteristics (γ) are non-linear. Therefore, even in the portion in which the γ characteristics are non-linear, an image of an excellent gradation performance can be formed. That is, when the gradation patterns of the same patch number are formed and the calibration is performed, many patches can be allocated to the density range in which a change in gradation characteristics is large, so that the calibration of a high precision can be executed.

In the above example, although the control has been performed in the designated single color, a deterioration in gradation performance due to the durability can also occur with respect to all of the kinds of toners used. Therefore, with regard to all of the colors of yellow, magenta, cyan, and black, the calibration can also be executed together.

Figure 39:
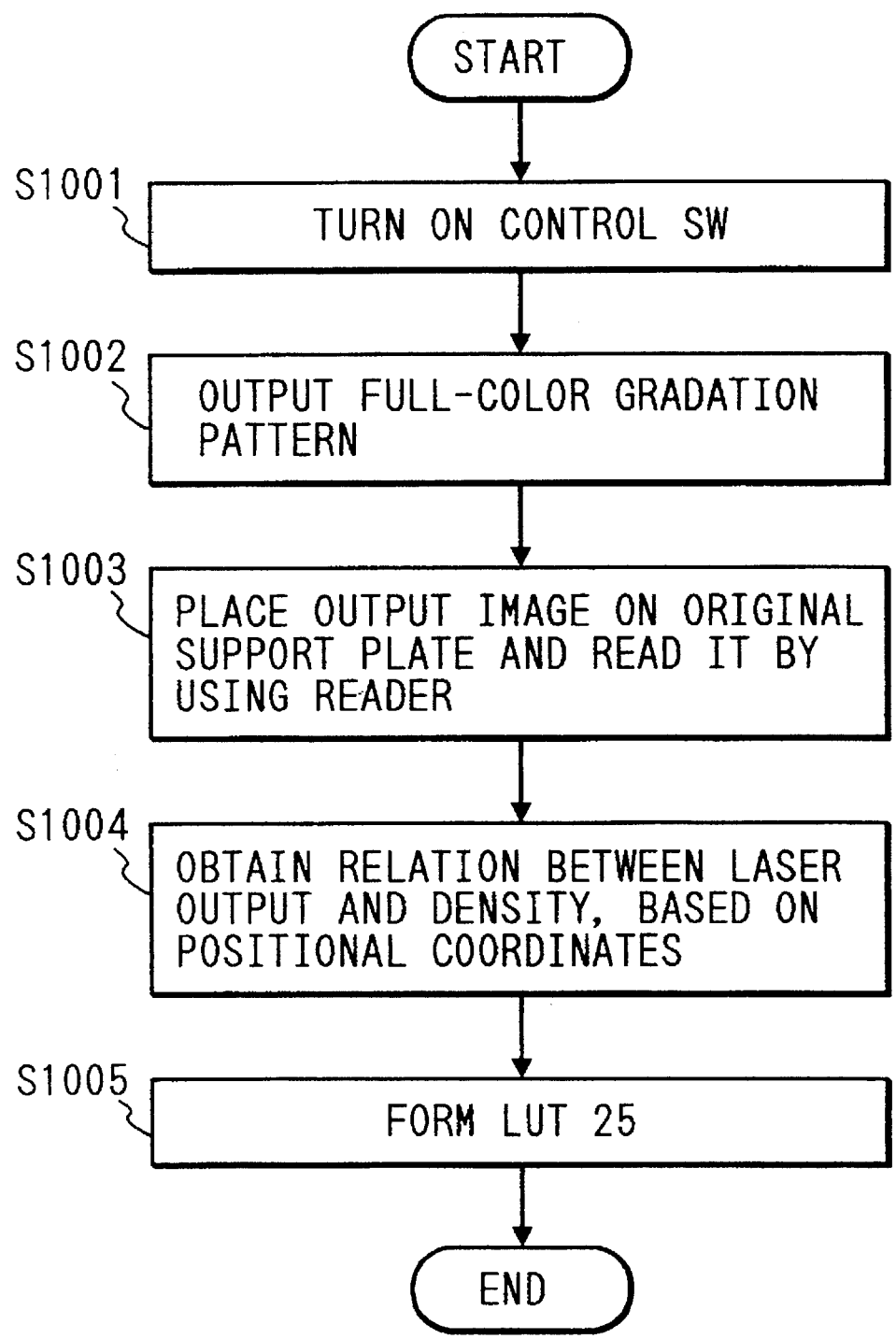
FIG. 39 is a diagram showing a modification of the embodiment 2.
Figure 40:
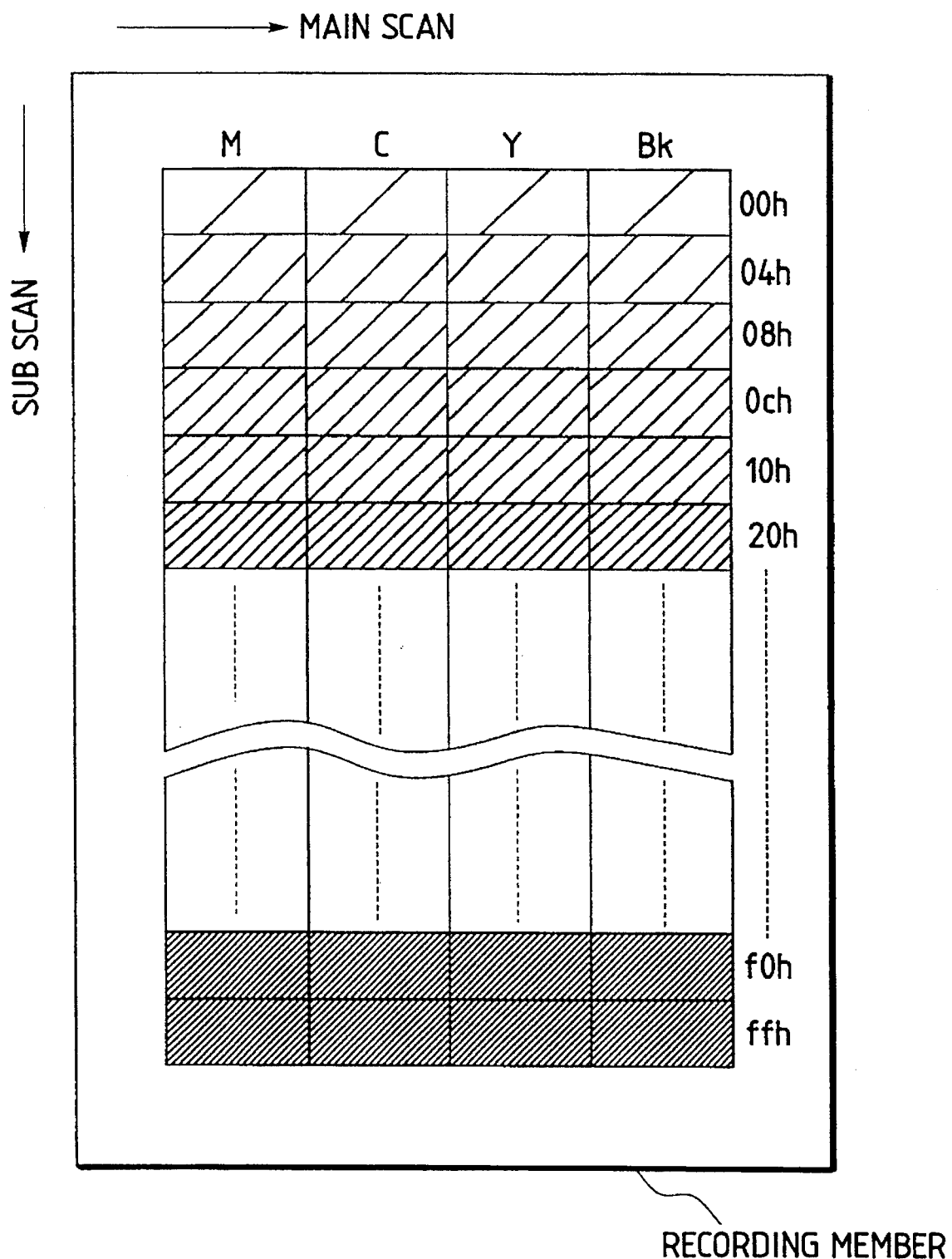
FIG. 40 is a diagram showing a modification of the embodiment 2.

FIG. 39 shows a flowchart. When the start switch for the control is turned on from the operation panel 217 (S1001), as shown in FIG. 40, a pattern image having a number of gradation patterns of the portions where the γ characteristics of all colors are non-linear is formed on the recording member by a pattern generator in the machine and is printed out in a manner similar to the above control.

Since the gradation characteristics also fluctuate by the environment or print output method, the embodiment is characterized in that the portion to be densely extracted is changed in accordance with the circumstances. In the first embodiment, gradation characteristics change in the cases where the pattern is output at a resolution of 200 lpi and where the pattern is output at a resolution of 400 lpi.

Figure 41A:
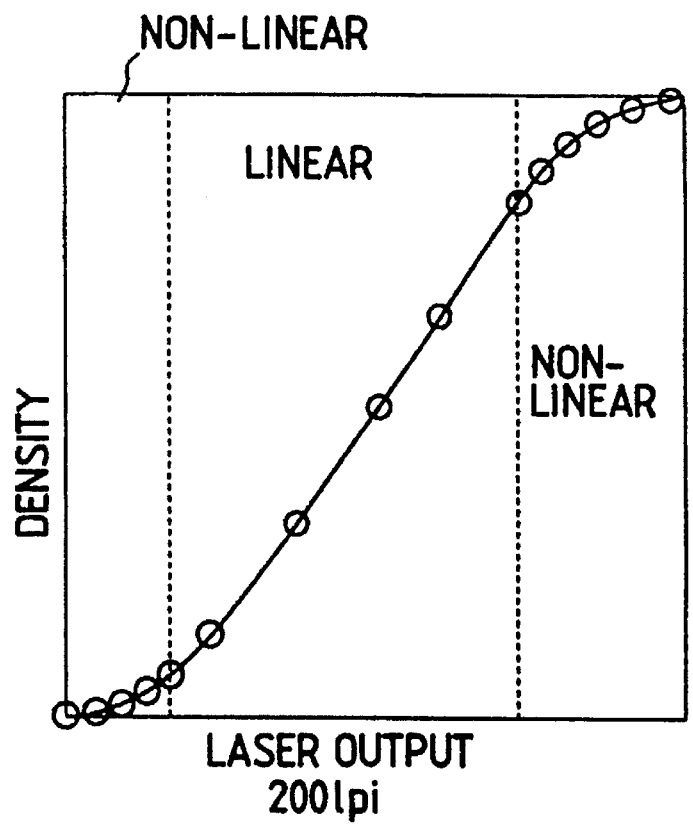
FIG. 41 is a diagram showing a modification of the embodiment 2.
Figure 41B:
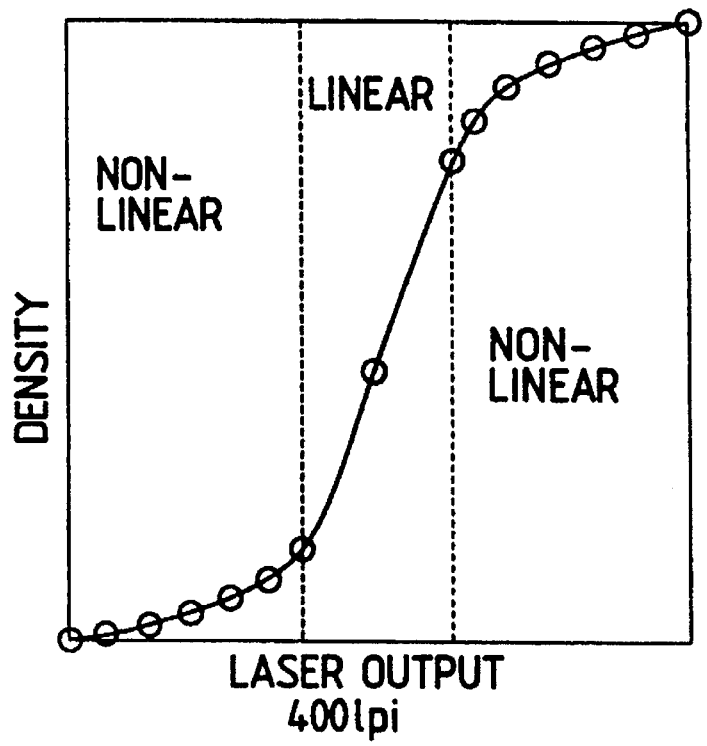

As mentioned above, in the case where the gradation characteristics change in dependence on the output resolution, the measurement point is changed as shown in FIG. 41 in accordance with them. By the measurement point, a control similar to the first embodiment is executed and an image of excellent gradation performance can be formed.

According to the embodiment as described above, the apparatus comprises: means for reading an original on the original support plate and digitizing it; means for forming the toner image on the image holding member; means for transferring the toner image on the image holding member onto the recording member; and means for fixing the toner image on the recording member, wherein the image pattern having many gradation patterns of at least one or more portions in which the γ characteristics are non-linear for judging the image characteristics is formed in the recording image after fixing, the image pattern is placed on the original support plate and read, and the density adjustment is executed by using the data, thereby enabling the picture quality of a more excellent gradation performance to be obtained.

Third embodiment

A construction of the image forming apparatus of the third embodiment is similar to that of the second embodiment.

FIG. 42 shows a flowchart of the embodiment. When the specific color which was judged such that there is an abnormality in the gradation characteristics is designated and the start switch for the control is turned on, on the operation panel 217 (S2001), a half-tone image in which a density of the uniform density of the whole surface of the specific output of the designated color is equal to near 0.6 is generated by the pattern generator in the machine. A printout sample 101' is again placed on the original support plate 102 of the reader and is irradiated by the light source 103. The reflected light is transmitted through the color separation optical system 104 and is converted to the reflection light amount signal by the CCD sensor 105 (S2003).

The reflection light amount signal is converted to the density data by the logarithm conversion (S2004).

The density of the whole region of the half-tone image is judged (one point is measured in one millimeter square).

Figure 43:
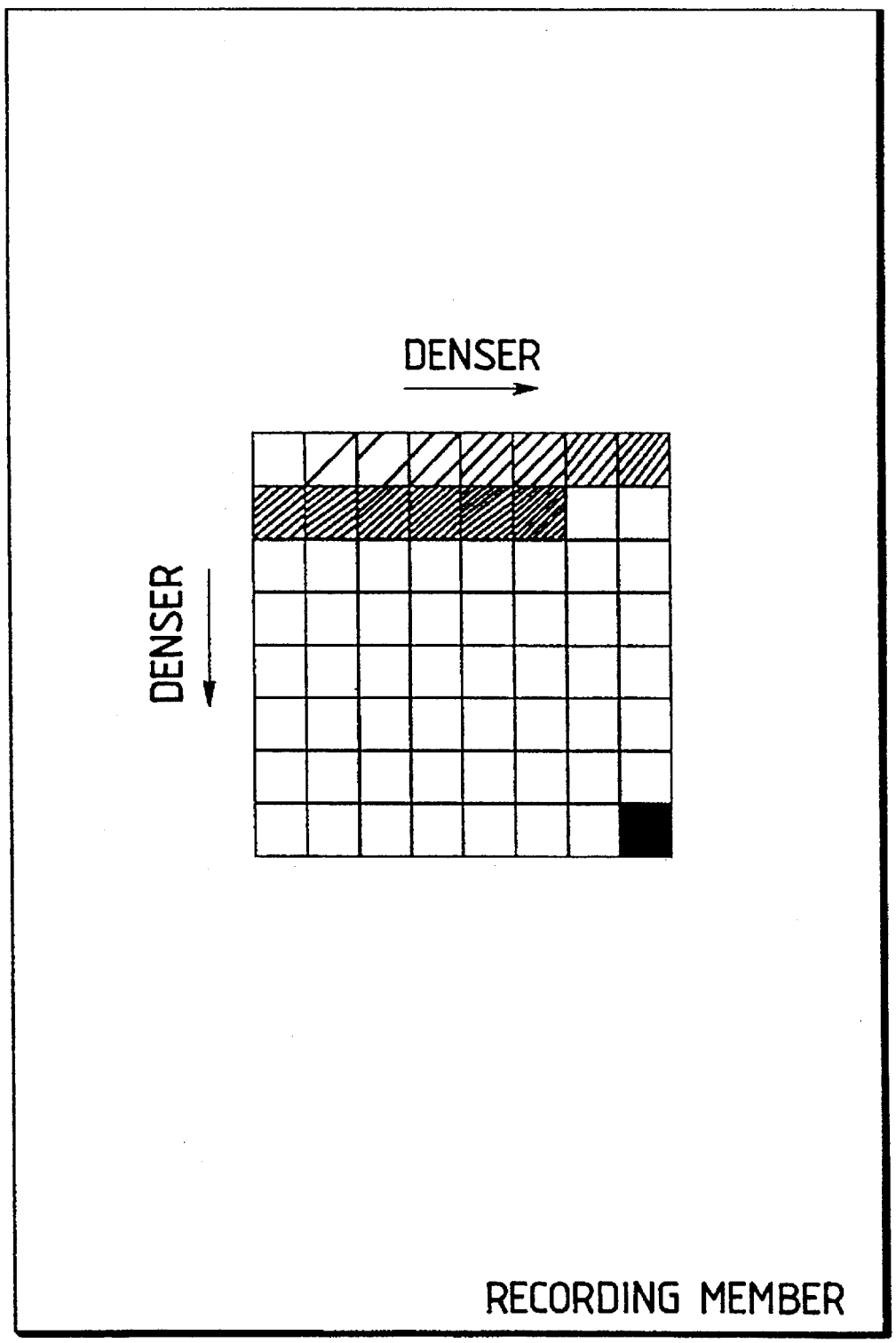
FIG. 43 is a diagram showing a test print of the embodiment 3.

When it is out of a range of a certain predetermined value (0.45 to 0.75) or when there is a difference of a predetermined value (0.15) or more between the maximum density and the minimum density, a message "Call service man" is displayed on the display 218 (S2007). After the abnormality of the machine was corrected, the gradation correction or calibration is again performed. When the result of the judgment indicates the set value, as shown in FIG. 43, the pattern image of 256 gradations of the designated color is formed on the recording member and is printed out. A gradation control (S2006) based on the pattern is similar to the first embodiment.

In the embodiment, the density data of 256 points is used and the data of the LUT 25 is calculated and set, thereby improving the gradation performance.

By executing the above control, in the case where the density partially changes due to some inconvenience even in the same density output, the erroneous operation of the gradation correction or calibration can be prevented.

Fourth embodiment

In the above third embodiment, when some abnormality occurs in the apparatus, the user is merely urged to call the service man. In the fourth embodiment, however, a position where the abnormality occurs is also notified.

The setting of the LUT 25 in the fourth embodiment is shown in FIG. 42 in a manner similar to the third embodiment, an explanation of the same processes as those in the third embodiment is omitted here.

Figure 44:
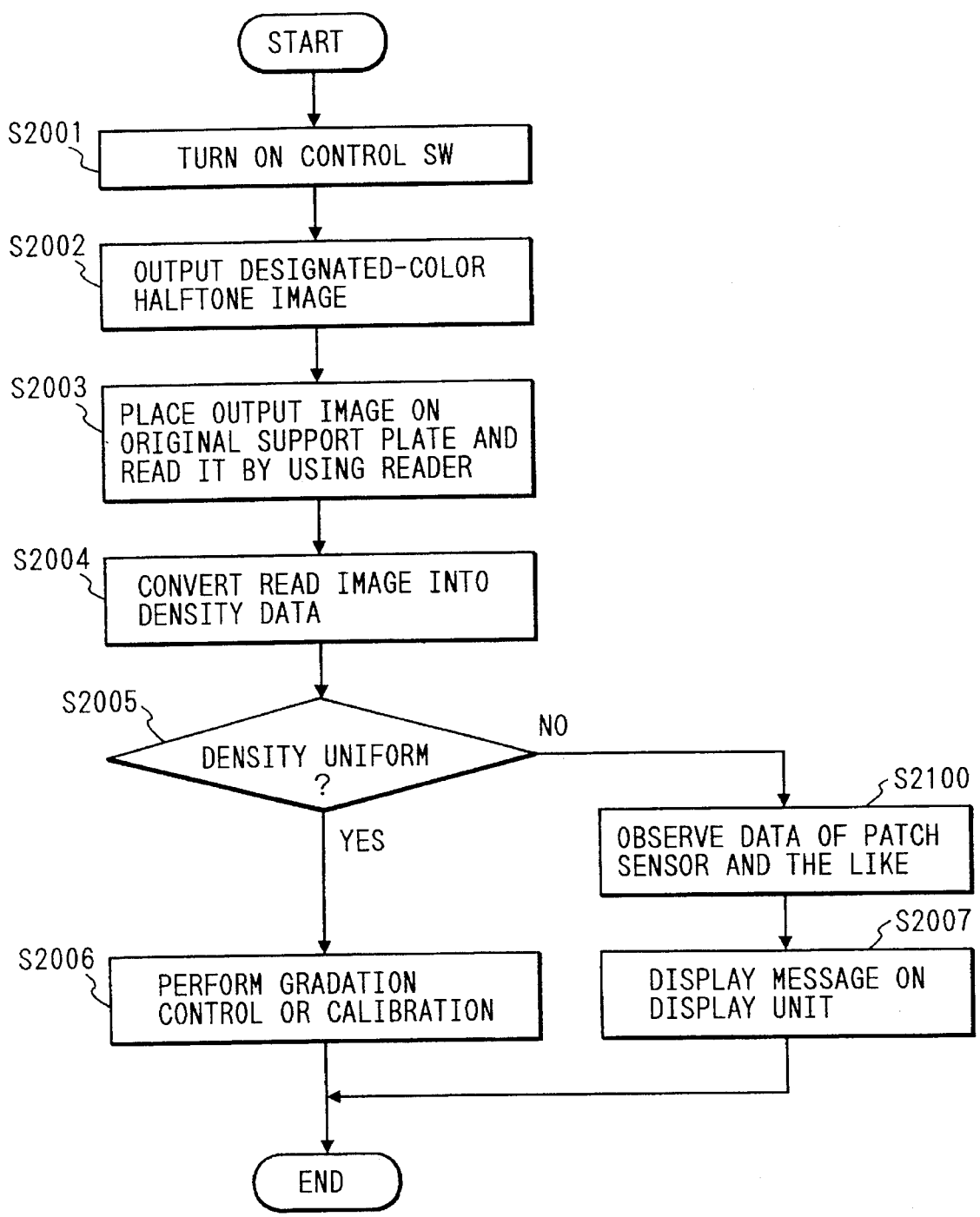
FIG. 44 is a flowchart for an embodiment 4.

In the fourth embodiment, when a check is made to see if there is an abnormality in the relation between the laser output level and the read density in step S2005 in FIG. 44, data such as a T/C ratio (ratio of the toner to the carrier) and the like is also simultaneously referenced. A method of obtaining the T/C ratio will now be described hereinbelow with reference to FIG. 45.

Figure 45:
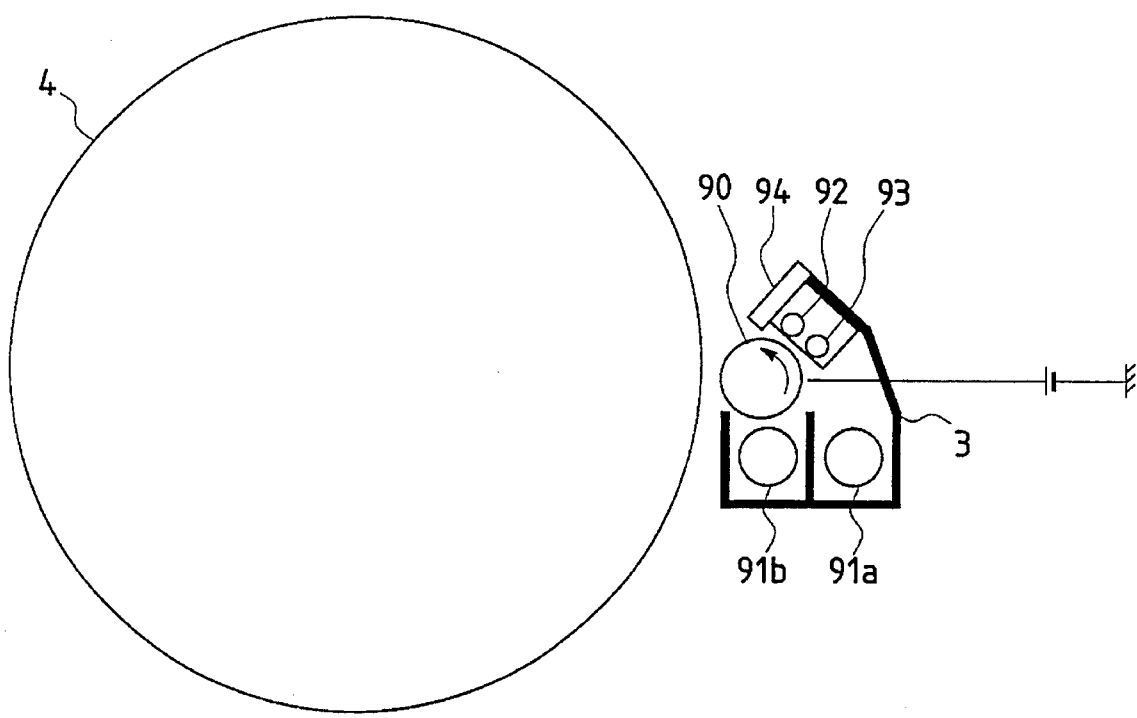
FIG. 45 is a constructional diagram of a developer.

FIG. 45 is a diagram showing a detailed construction of the developing device 1003 in FIG. 34. In FIG. 45, the toner is developed by the developing device 1003 so that the latent image formed on the photosensitive drum 1004 can be visually observed. However, in the embodiment, a developing agent comprising two components of the carrier and the toner is used.

In order to preserve the proper radio of the image density to the toner density (T/C ratio) in the developing agent, the T/C ratio has to beheld constant.

The developing device 1003 has screws 91a and 91b to uniformly stir the developing agent. The screw 91a conveys the developing agent by rotating on the right side in the diagram. The screw 91b conveys the developing agent by rotating on the left side in the diagram. Thus, the developing agent is circulated in the developing device 1003.

Since the carrier in the developing agent has magnetism, it is drawn up in a mixed state of the carrier and toner by a magnet built in a development sleeve 90 and is uniformly coated on the photosensitive drum 1004 by a blade 94. The toner of an amount corresponding to a difference between a voltage applied to the development sleeve 90 and a potential of the latent image on the photosensitive drum 1004 is deposited on the photosensitive drum 1004, so that the development is performed.

The developing device 1003 has therein an optical sensor comprising an LED 92 and a photodiode 93 in a state in which the optical sensor faces the developing agent drawn up to the development sleeve 90.

Each of the LED 92 and photodiode 93 has a peak at a wavelength of 950 nm. The toner which is reflected in such a wavelength range is used. The carrier which is absorbed in such a wavelength range is used. Therefore, when an output of the photodiode 93 is high, the T/C ratio is high. On the contrary, when the output of the photodiode 93 is low, the T/C ratio is low.

By previously storing the output of the photodiode 93 in a state of the set T/C ratio and by comparing with the present output of the photodiode 93, a present T/C ratio can be detected by the a difference between them.

When it is detected that the present T/C ratio is low, in order to return the T/C ratio to the set value, the toner is supplied into the developing device 1003 from a toner supply unit (not shown).

The T/C ratio obtained as described above is referred when judging whether there is an abnormality in the relation between the laser output level and the read density in step S2005 in FIG. 44.

In step S2005 in FIG. 44, when it is judged that there is an abnormality in the relation between the laser output level and the read density, step S2100 follows and a message is displayed in the display 218. In this instance, a message to presume an abnormality occurrence position on the basis of the T/C ratio obtained by the optical sensor in the developing device 1003 mentioned above is displayed.

Specific examples of the messages to presume the above abnormality occurrence position will now be described hereinbelow.

For example, when considering that the read densities are set to three stages of "dense", "normal", and "light" and the T/C ratio is also set to three stages of "dense", "normal", and "light", nine states as shown in the following table 1 are considered.

TABLE 1

| T/C ratio | Reader density | | |
|---|---|---|---|
|  | dense | normal | light |
| dense | 1 | 2 | 3 |
| normal | 4 | 5 | 6 |
| light | 7 | 8 | 9 |

Messages for those states shown in the above table 1 can be set, for example, as shown in the following table 2.

TABLE 2

| State | Message |
|---|---|
| 1 | Until the T/C ratio decreases, please continuously output a picture for a little while |
| 2, 3, 6 | Please examine developing device or transfer relation |
| 4, 7, 8 | Please examine developing device |
| 5 | Normal |
| 9 | Please examine hopper |

As described above, according to the fourth embodiment, when an abnormality such as an apparatus abnormality or the like occurs at the time of gradation correction or calibration, it is detected and, further, the abnormality occurring position is presumed, so that an erroneous operation can be prevented and the maintenance can be easily executed.

In the above embodiment 4, one half-tone image is output in order to confirm the uniform density. If it is correct, the pattern for the gradation control is output. However, they can be also output as one image together.

Figure 46:
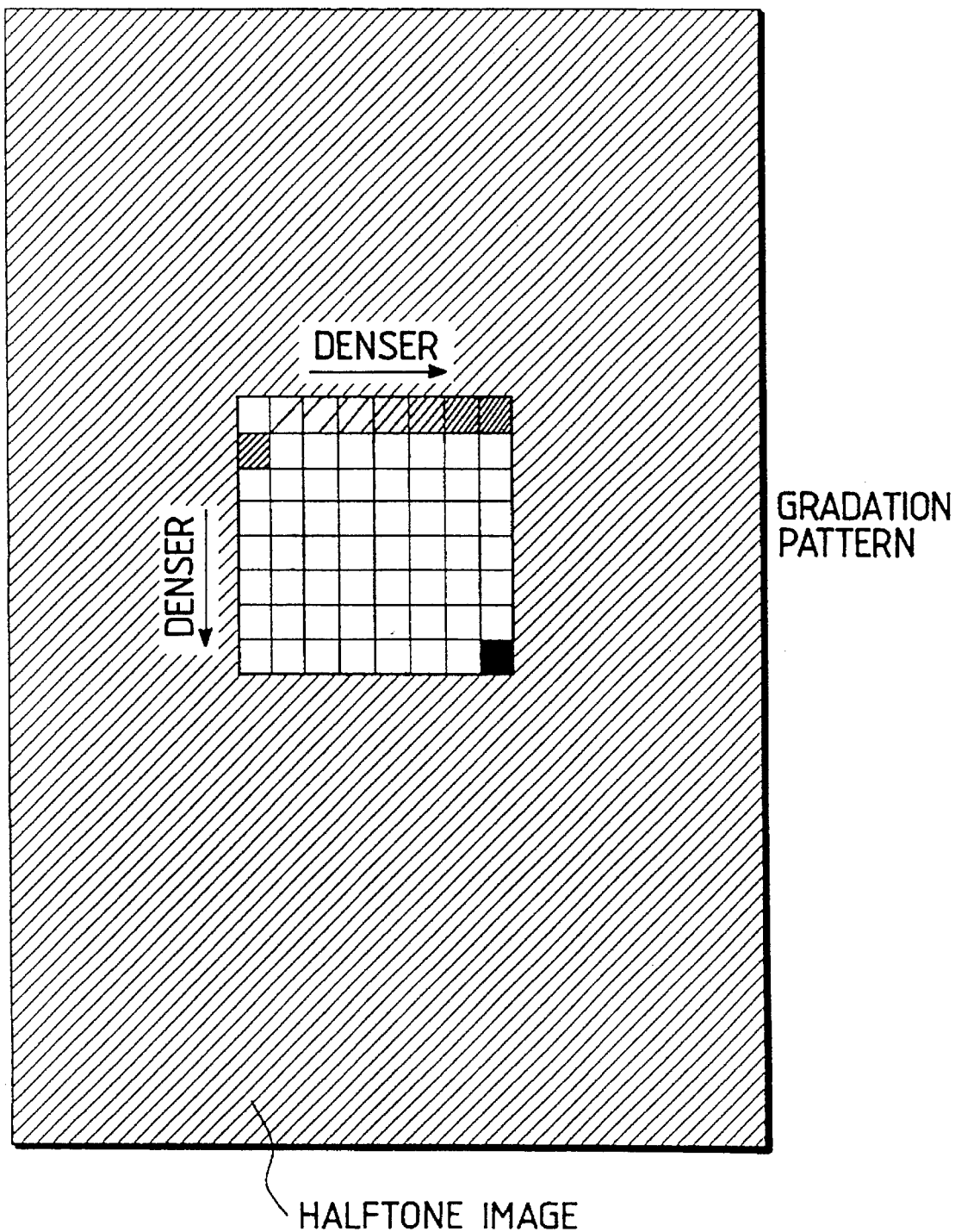
FIG. 46 is a diagram showing a modification of a test print.

That is, as shown in FIG. 46, at least one or more gradation image patterns for judging image characteristics are formed in a portion of the recording member and a uniform density half-tone pattern is output for the other portions.

With such a method, a troublesome operation to form a test pattern a number of times can be omitted and an efficient calibration can be performed.

As described above, according to the embodiment, the apparatus has means for reading the original on the original support plate and digitizing it and means for forming an image on the basis of the digital signal, wherein before performing the gradation correction or calibration, a uniform output image is generated and is placed on the original support plate and is read, and in the case where an abnormal portion in the read data, a message "Call the service man" is displayed and no gradation correction or calibration is performed in this instance. Further, data of a patch sensor (FIG. 45) or the like is monitored and in the case where although the T/C ratio is high, the density is thin, a message indicating that the occurrence of an abnormality such as "1. Check whether there is an abnormality in developing device. 2. Check whether there is an abnormality in copy transfer. 3. Check whether there is an abnormality in hopper. 4. ******" or the like can be presumed is also displayed. After the abnormality of the machine is repaired, the gradation correction or calibration is again executed. Thus, an erroneous operation of the gradation correction or calibration can be prevented and the maintenance can be easily executed.

As described above, although the embodiment has been described with respect to the gradation control in the electrophotographic system as an example, the invention can also be applied to an image forming apparatus using a printer of the ink jet system, particularly, what is called a bubble jet system having a head of the type such that a liquid droplet is emitted by using film boiling by thermal energy.

The invention is not limited to the recording apparatus for representing multi-gradation with respect to one pixel, and is also applicable to a recording apparatus for representing a binary value with regard to one pixel.

In the above example, although a feedback destination at the time of the calibration has been set to the gamma correction or calibration, for instance, the data can also be fed back to the masking & UCR of the masking & UCR circuit 208 in order to preferably correct a color mixture of recording members of a plurality of colors.

The present invention is not limited to the foregoing embodiments but many modifications and variations are possible within the spirit and scope of the appended claims of the invention.

What is claimed is:

1. An image forming apparatus comprising:

input means for inputting image data;

generating means for generating gradation pattern data;

forming means for forming an image on a medium in accordance with the image data or the gradation pattern data;

detecting means for detecting a gradation pattern on the medium formed by said forming means in accordance with the gradation pattern; and control means for controlling a condition of said image forming apparatus based on the detection result of said detecting means;

wherein said gradation pattern comprises a plurality of areas of which density levels are different from each other and a number of density levels are smaller in a density range in which a gradation characteristic is substantially more linear than in another density range.

2. An apparatus according to claim 1, wherein said medium is a photosensitive member.

3. An apparatus according to claim 1, wherein said medium is a paper.

4. An apparatus according to claim 1, wherein said input means is a reading means for scanning an original and generating image data.

5. An apparatus according to claim 1, wherein said generating means includes a ROM.

6. An apparatus according to claim 1, wherein said forming means forms a latent image onto a photosensitive member and develops the latent image and forms an image onto the medium.

7. An apparatus according to claim 1, wherein said generating means generates a gradation pattern for each color component.

8. An apparatus according to claim 1, wherein said generating means generates a plurality of gradation patterns of which resolutions are different from each other.

9. An apparatus according to claim 8, wherein said number of density levels in a first gradation pattern is different from said number of density levels in a second gradation pattern.

10. An apparatus according to claim 1, wherein said control means controls an adjustment of the gradation characteristic of said image data.

11. An apparatus according to claim 10, wherein said adjustment is performed by a lookup table.

12. An image forming method comprising:

an input step of inputting image data;

a generating step of generating gradation pattern data;

a forming step of forming an image on a medium in accordance with the image data or the gradation pattern data;

a detecting step of detecting a gradation pattern on the medium formed in said forming step in accordance with the gradation pattern data; and a control step of controlling a condition of an image forming apparatus based on the detection result of said detecting step, wherein said gradation pattern comprises a plurality of areas of which density levels are different from each other and a number of density levels are smaller in a density range in which a gradation characteristic is substantially more linear than in another density range.

13. An image forming apparatus comprising:

input means for inputting image data;

generating means for generating a plurality of gradation pattern data;

forming means for forming an image on a medium in accordance with the image data or the gradation pattern data;

detecting means for detecting a gradation pattern on the medium formed by said forming means in accordance with the gradation pattern; and control means for controlling a condition of said image forming apparatus based on the detection result of said detecting means;

wherein each such gradation pattern comprises a plurality of areas of which density levels are different from each other and a number of density levels are smaller in a density range in which a gradation characteristic is substantially more linear than in another density range, and the number of density levels in a first gradation pattern is different from the number of density levels in a second gradation pattern.

14. An apparatus according to claim 13, wherein said medium is a photosensitive member.

15. An apparatus according to claim 13, wherein said medium is a paper.

16. An apparatus according to claim 13, wherein said input means is a reading means for scanning an original and generating image data.

17. An apparatus according to claim 13, wherein said generating means includes a ROM.

18. An apparatus according to claim 13, wherein said forming means forms a latent image onto a photosensitive member and develops the latent image and forms an image onto the medium.

19. An apparatus according to claim 13, wherein said generating means generates a gradation pattern for each color component.

20. An apparatus according to claim 13, wherein said control means controls an adjustment of the gradation characteristic of said image data.

21. An apparatus according to claim 20, wherein said adjustment is performed by a lookup table.

22. An image forming method comprising:

an input step of inputting image data;

a generating step of generating a plurality of gradation pattern data;

a forming step of forming an image on a medium in accordance with the image data or the gradation pattern data;

a detecting step of detecting a gradation pattern on the medium formed in said forming step in accordance with the gradation pattern data; and a control step of controlling a condition of an image forming apparatus based on the detection result of said detecting step, wherein each such gradation pattern comprises a plurality of areas of which density levels are different from each other and a number of density levels are smaller in a density range in which a gradation characteristic is substantially more linear than in another density range, and the number of density levels in a first gradation pattern is different from the number of density levels in a second gradation pattern.

\* \* \* \* \*

UNITED STATES PATENT AND TRADEMARK OFFICE
CERTIFICATE OF CORRECTION

PATENT NO. : 5,566,372

DATED : October 15, 1996

INVENTORS : YUICHI IKEDA ET AL.

Page 1 of 3

It is certified that error appears in the above-identified patent and that said Letters Patent is hereby corrected as shown below:

<u>ON TITLE PAGE</u>

[56] U.S. PATENT DOCUMENT  Insert: --4,929,978  5/1990 Kanamori et al.--.

<u>IN THE DRAWINGS</u>

Sheet 16 of 39  Fig 16, "AMOUND" should read --AMOUNT--.

<u>COLUMN 1</u>

Line 11,  "Background" should read --Background Art--.

<u>COLUMN 6</u>

Line 38,  "an" should read --a--;
Line 51,  "than" should read --of--.

<u>COLUMN 12</u>

Line 47,  "of" should read --of the--;

UNITED STATES PATENT AND TRADEMARK OFFICE
CERTIFICATE OF CORRECTION

PATENT NO. : 5,566,372

DATED : October 15, 1996

INVENTORS : YUICHI IKEDA ET AL.

It is certified that error appears in the above-identified patent and that said Letters Patent is hereby corrected as shown below:

COLUMN 12

Line 48, "stabilization" should read --stabilization of the--.

COLUMN 13

Line 47, "tribology" should read --triboluminesence--.

COLUMN 16

Line 25, "the" should read --a--.

COLUMN 19

Line 45, "radio" should read --ratio--.

UNITED STATES PATENT AND TRADEMARK OFFICE
CERTIFICATE OF CORRECTION

PATENT NO. : 5,566,372

DATED : October 15, 1996

INVENTORS : YUICHI IKEDA ET AL.

It is certified that error appears in the above-identified patent and that said Letters Patent is hereby corrected as shown below:

COLUMN 20

Line 11, "a" should be deleted.

COLUMN 21

Line 2, be also" should read --also be--.

Signed and Sealed this

Eighteenth Day of March, 1997

BRUCE LEHMAN

Attest:

Attesting Officer    Commissioner of Patents and Trademarks